United States Patent
Knight et al.

(10) Patent No.: US 11,105,366 B2
(45) Date of Patent: Aug. 31, 2021

(54) LONG SPAN LEAD SCREW ASSEMBLY WITH ANTI-BACKLASH NUT AND WEAR COMPENSATED LOAD BEARING ELEMENT

(71) Applicant: Haydon Kerk Motion Solutions, Inc., Waterbury, CT (US)

(72) Inventors: Keith Hastings Knight, New Boston, NH (US); Brian Huntley Regan, Manchester, NH (US)

(73) Assignee: Haydon Kerk Motion Solutions, Inc., Waterbury, CT (US)

( * ) Notice: Subject to any disclaimer, the term of this patent is extended or adjusted under 35 U.S.C. 154(b) by 232 days.

(21) Appl. No.: 16/437,293

(22) Filed: Jun. 11, 2019

(65) Prior Publication Data

US 2019/0376554 A1    Dec. 12, 2019

Related U.S. Application Data

(60) Provisional application No. 62/684,007, filed on Jun. 12, 2018.

(51) Int. Cl.
*F16C 29/12* (2006.01)
*F16C 29/04* (2006.01)
(Continued)

(52) U.S. Cl.
CPC ............ *F16C 29/12* (2013.01); *F16C 13/006* (2013.01); *F16C 29/005* (2013.01); *F16C 29/045* (2013.01); *F16C 29/0626* (2013.01)

(58) Field of Classification Search
CPC .. F16C 29/005; F16C 29/045; F16C 29/0626; F16C 29/073; F16C 29/12; F16C 29/13;
(Continued)

(56) References Cited

U.S. PATENT DOCUMENTS 3,287,759 A * 11/1966 Foltz ..................... E05D 15/063
                                                     16/87 R
3,661,452 A    5/1972 Hewes
(Continued)

FOREIGN PATENT DOCUMENTS

DE    1192492 B    5/1965
DE    78841 A      1/1971
(Continued)

OTHER PUBLICATIONS

International Search Report and Written Opinion for PCT/US2019/036539 dated Oct. 31, 2019 titled "Long Span Lead Screw Assembly With Anti-backlash Nut and Wear Compensated Load Bearing Element".

(Continued)

*Primary Examiner* — Marcus Charles
(74) *Attorney, Agent, or Firm* — Hamilton, Brook, Smith & Reynolds, P.C.

(57) ABSTRACT

A motion device including a carriage for traveling along a rail. The carriage can have at least one rotatable fixed position roller, and at least one rotatable adjustable roller that is movable relative to the at least one fixed position roller for self compensating for play between the rollers and mating surfaces of the rail. Each adjustable roller can be part of a movable roller portion movably mounted to the carriage. The movable roller portion can be adjustably movable by a self adjustment mechanism. The self adjustment mechanism can include a mechanical advantage pushing member for movably engaging the movable roller portion. The mechanical advantage pushing member can be resiliently biased against the movable roller portion by a biasing arrangement. The biasing arrangement can cause movement of the mechanical advantage pushing member and the mov- (Continued)

able roller portion for moving the at least one adjustable roller for self compensating for play.

44 Claims, 28 Drawing Sheets

(51) Int. Cl.
    *F16C 29/06* (2006.01)
    *F16C 13/00* (2006.01)
    *F16C 29/00* (2006.01)

(58) Field of Classification Search
    CPC .. F16C 29/126; F16C 2322/39; F16C 29/063; F16C 13/006; F16H 25/2006
    USPC .............................. 384/40–41, 49, 50, 55, 57
    See application file for complete search history.

(56) References Cited

U.S. PATENT DOCUMENTS

| | | | |
|---|---|---|---|
| 5,090,171 A * | 2/1992 | Kano | E04B 2/827 |
| | | | 52/243.1 |
| 6,149,308 A | 11/2000 | Schroeder | |
| 6,450,687 B1 | 9/2002 | Schroeder | |
| 7,219,570 B2 | 5/2007 | Erikson | |
| 7,350,270 B2 | 4/2008 | Fournier | |
| 8,070,361 B2 * | 12/2011 | Schroeder | F16C 29/12 |
| | | | 384/57 |
| 8,850,659 B2 * | 10/2014 | Ewing | E05D 15/0634 |
| | | | 16/91 |
| 9,995,073 B2 * | 6/2018 | Svenson | E05D 15/26 |
| 2007/0295128 A1 | 12/2007 | Erikson | |
| 2009/0080816 A1 * | 3/2009 | Schroeder | F16C 29/005 |
| | | | 384/42 |
| 2009/0285513 A1 * | 11/2009 | Schroeder | F16C 29/045 |
| | | | 384/50 |

FOREIGN PATENT DOCUMENTS

| | | | | |
|---|---|---|---|---|
| DE | 3834900 A1 | | 4/1990 | |
| DE | 9016625 U1 | | 2/1991 | |
| DE | 4325045 A1 | | 2/1995 | |
| DE | 19619449 A1 * | 12/1996 | ............ F16C 29/045 |
| DE | 202005016345 U1 * | 1/2006 | ............ F16C 29/045 |
| DE | 202012003695 U1 * | 7/2013 | ............ F16C 29/045 |
| EP | 0245656 B1 * | 7/1990 | ............ F16C 29/005 |
| EP | 2189671 A1 * | 5/2010 | ............ F16C 29/045 |
| EP | 2584209 A1 * | 4/2013 | ............. F16C 29/12 |
| JP | H07224835 A | | 8/1995 | |
| WO | 95021336 A1 | | 8/1995 | |
| WO | WO-2010057327 A1 * | 5/2010 | ............ F16C 29/001 |
| WO | 2017064742 A1 | | 4/2017 | |
| WO | 2019241240 A1 | | 12/2019 | |

OTHER PUBLICATIONS

International Preliminary Report on Patentability dated Dec. 24, 2020 in International Application No. PCT/US2019/036539; "Long Span Lead Screw Assembly With Anti-backlash Nut and Wear Compensated Load Bearing Element".

* cited by examiner

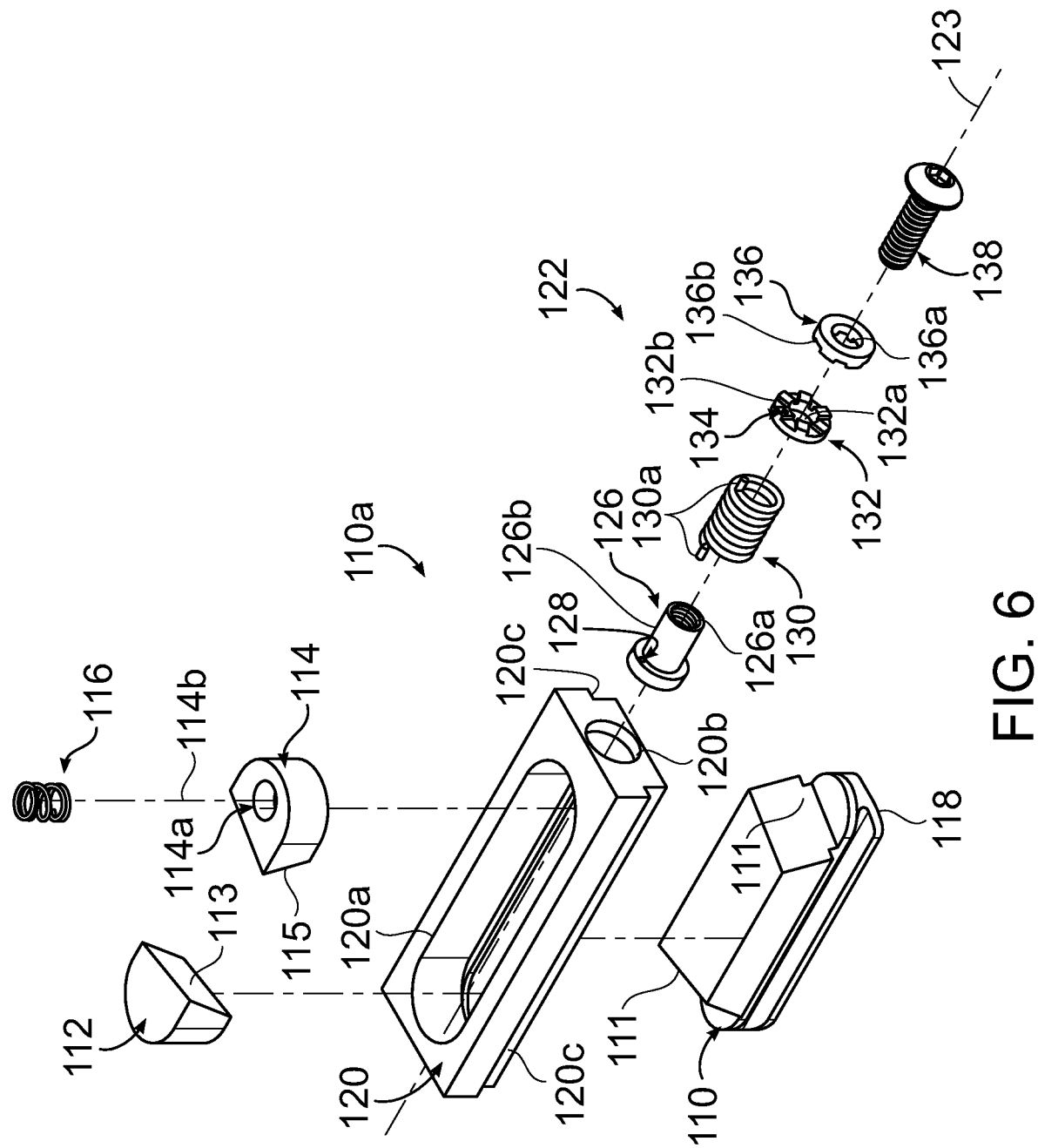

LONG SPAN LEAD SCREW ASSEMBLY WITH ANTI-BACKLASH NUT AND WEAR COMPENSATED LOAD BEARING ELEMENT

RELATED APPLICATION

This application claims the benefit of U.S. Provisional Application No. 62/684,007, filed on Jun. 12, 2018. The entire teachings of the above application are incorporated herein by reference.

BACKGROUND

Linear guide mechanisms, also known as linear guide systems, are used for many applications, such as industrial settings, including but not limited to laboratory automation equipment, machine tools, gantry style robotics, and the like. Often these applications will need to slide a load axially back and forth as the machine operation is performed.

With regard to any precision motion machine operation application such as for machining a work piece, particularly the linear guide mechanism should move the load along an axis with little or no play or deflection away from the axis of the linear slide. Any play or movement can be detrimental to the machine operation, for example if the operation is computer controlled. Any play or deflective movement in the linear slide mechanism can result in misalignment of the machine axis and the workpiece. Additionally, in lead screw applications, long stroke lengths are often limited by speed restrictions due to unstable operating conditions as well as life limitations due to wear of components.

SUMMARY

The present invention provides a motion device which can self compensate for the play of a carriage that slides relative to a linear guide rail, and also self compensates for backlash between the lead screw and follower nut that drives the carriage.

The motion device can include a carriage for traveling along a rail. The carriage can have at least one fixed position low friction bearing or slide element or rotatable roller, and at least one adjustable low friction bearing or slide element or rotatable roller that is movable relative to the at least one fixed position roller for self compensating for play between the rollers and mating rail race surfaces of the rail. Each at least one adjustable roller can be part of a movable roller portion movably mounted to the carriage. The movable roller portion can be adjustably movable by a self adjustment mechanism. The self adjustment mechanism can include a mechanical advantage pushing, urging, advancing or moving member capable of movably engaging the movable roller portion. The mechanical advantage pushing member can be resiliently biased against the movable roller portion by a biasing arrangement. The biasing arrangement can be capable of causing movement of the mechanical advantage pushing member and the movable roller portion for moving the at least one adjustable roller for self compensating for the play.

In particular embodiments, the rail can be a linear rail. The rail can have bottom rail race surfaces that face generally upwardly for engaging the at least one fixed position roller, and top rail race surfaces that face generally downwardly for engaging the at least one adjustable roller in a generally opposed manner. The bottom rail race surfaces and opposing top rail race surfaces can angle towards each other. The biasing arrangement in one embodiment can be a spring and the movable roller portion can include a movable adjustment member to which the adjustable roller is rotatably mounted. The mechanical advantage pushing member can be an angled wedge positioned under the movable adjustment member. The angled wedge can be laterally biased by the spring, thereby capable of providing lateral movement of the angled wedge to move the movable adjustment member and adjustable roller upwardly against the top rail race surface with mechanical advantage for self compensating for play.

In another embodiment, the biasing arrangement can be a torsion or torsional spring and the mechanical advantage pushing member can be a rotatable threaded self adjusting screw. The movable roller portion can include a movable adjustment member to which the adjustable roller is rotatably mounted. The movable adjustment member can be a pivoting arm to which the adjustable roller is positioned at one end, and the opposite end is engaged by the self adjusting screw. The self adjusting screw can be torsionally biased by the torsional spring, thereby capable of providing rotational movement of the self adjusting screw with axial advancement to move the pivoting arm and the adjustable roller upwardly against the top rail race surface with mechanical advantage for self compensating for play.

In another embodiment, the biasing arrangement can be a torsional spring and the mechanical advantage pushing member can be a rotatable cam that is torsionally biased with the torsional spring. The torsional spring can rotatably bias the cam against a bearing surface associated with the at least one adjustable roller, thereby capable of providing lateral movement of the at least one adjustable roller against rail race surfaces with mechanical advantage for self compensating for play.

In another embodiment, the at least one fixed position roller can engage lower rail race surfaces and the at least one adjustable position roller can engage upper rail race surfaces. The biasing arrangement can be a torsional spring and the mechanical advantage pushing member can be a rotatable threaded self adjusting nut that is rotatably mounted to a threaded screw. The torsional spring can rotatably bias the self adjusting nut downwardly against the at least one adjustable position roller, thereby capable of providing downward movement of the at least one adjustable position roller against the upper rail race surfaces with mechanical advantage for self compensating for play.

In some embodiments, the motion device can further include a linear rail, and a rotatable lead screw extending along a longitudinal axis can be mounted to the rail for driving the carriage along the rail. The carriage can include axially spaced first and second partial follower nuts having respective first and second thread forms for engaging mating threads on the lead screw. The first partial follower nut can be biased against the lead screw in a direction transverse to the longitudinal axis by a first nut transverse self adjustment mechanism for removing backlash. The second partial follower nut can also be biased against the lead screw in a direction transverse to the longitudinal axis by a second nut transverse self adjustment mechanism for removing backlash. The second partial follower nut can be further biased against the lead screw axially along the longitudinal axis relative to the first partial follower nut, by a second nut axial self adjustment mechanism for removing backlash during high load or high acceleration operation.

In particular embodiments, the second partial follower nut and the second nut transverse self adjustment mechanism can be housed within a slide block. The slide block can be axially slidably mounted within an axial slot within the carriage. The second nut axial self adjustment mechanism can axially bias the slide block and the second partial follower nut within the axial slot, and relative to the first partial follower nut.

In some embodiments, the carriage can include four fixed position rollers and four adjustable rollers positioned between the fixed position rollers. In some embodiments, the biasing arrangement can be a torsional spring for rotating the mechanical advantage pushing member. Rotation of the mechanical advantage pushing member can cause advancement of the mechanical advantage pushing member against the movable roller portion for causing movement of the movable roller portion and the adjustable roller with mechanical advantage for self compensating for the play. In some embodiments, the mechanical advantage pushing member can be a threaded nut. A torsional spring can rotate the threaded nut for advancing the threaded nut against the adjustable roller for moving the adjustable roller with mechanical advantage. In some embodiments, the linear rail can include rail race surfaces that the fixed position and adjustable rollers can engage from generally opposite sides. In some embodiments, the mechanical advantage pushing member can include a rotatable cam. A torsional spring can rotate the rotatable cam for advancing surfaces of the cam against the movable roller portion for moving the movable roller portion and the adjustable roller with mechanical advantage.

The present invention can also provide a motion device including a linear rail and a carriage slidably mounted to the rail for travel along the rail. A rotatable lead screw can extend along a longitudinal axis and can be mounted to the rail for driving the carriage along the rail. The carriage can include axially spaced first and second partial follower nuts having respective first and second thread forms for engaging mating threads on the lead screw. The first partial follower nut can be biased against the lead screw in a direction transverse to the longitudinal axis by a first nut transverse self adjustment mechanism for removing backlash. The second partial follower nut can also be biased against the lead screw in a direction transverse to the longitudinal axis by a second nut transverse self adjustment mechanism for removing backlash. The second partial follower nut can be further biased against the lead screw axially along the longitudinal axis relative to the first partial follower nut, by a second nut axial self adjustment mechanism for removing backlash during high load or speed, or high acceleration operation.

In particular embodiments, the second partial follower nut and second nut transverse self adjustment mechanism can be housed within a slide block. The slide block can be axially slidably mounted within an axial slot within the carriage. The second nut axial self adjustment mechanism can axially bias the slide block and the second partial follower nut within the axial slot, and relative to the first partial follower nut. The second nut axial self adjustment mechanism can include a mechanical advantage threaded member that is axially connected to the slide block and rotationally biased by a torsional spring for axially biasing the slide block with mechanical advantage. In another embodiment, the second nut axial self adjustment mechanism can include a mechanical advantage angled wedge that engages across an axial end of the slide block and is biased by a spring for axially biasing the slide block with mechanical advantage. In some embodiments, the slide block and the second partial follower nut can be biased at least one of towards and away from the first partial follower nut for removing backlash. In some embodiments, the carriage can have at least one rotatable fixed position roller and at least one rotatable adjustable roller that is movable relative to the at least one fixed position roller for self compensating for play between the rollers and mating rail race surfaces of the rail. Each at least one adjustable roller can be part of a movable roller portion movably mounted to the carriage. The movable roller portion can be adjustably movable by a self adjustment mechanism. The self adjustment mechanism can include a mechanical advantage pushing member capable of movably engaging the movable roller portion. The mechanical advantage pushing member can be resiliently biased against the movable roller portion by a biasing arrangement. The biasing arrangement can be capable of causing movement of the mechanical advantage pushing member and the movable roller portion for moving the adjustable roller for self compensating for the play.

The present invention can also provide a method of rollably moving a carriage of a motion device along a rail. The carriage can have at least one rotatable fixed position roller, and at least one rotatable adjustable roller, that roll on mating engagement surfaces of the rail. The at least one adjustable roller can move relative to the at least one fixed position roller for self compensating for play between the rollers and the mating rail race surfaces of the rail. Each at least one adjustable roller can be part of a movable roller portion movably mounted to the carriage. The movable roller portion can be adjustably moved by a self adjustment mechanism. The self adjustment mechanism can include a mechanical advantage pushing member movably engaging the movable roller portion. The mechanical advantage pushing member can be resiliently biased against the movable roller portion by a biasing arrangement. The biasing arrangement can cause movement of the mechanical advantage pushing member and the movable roller portion for moving the adjustable roller, for self compensating for the play.

In particular embodiments, the rail can be a linear rail including bottom rail race surfaces that face generally upwardly and top rail race surfaces that face generally downwardly. The bottom rail race surfaces can be engaged with the at least one fixed position roller and the top rail race surfaces with the at least one adjustable roller in a generally opposed manner. The bottom rail race surfaces and opposing top rail race surfaces can angle towards each other. In one embodiment, the biasing arrangement can be a spring and the movable roller portion can include a movable adjustment member to which the adjustable roller is rotatably mounted. The mechanical advantage pushing member can be an angled wedge positioned under the movable adjustment member. The angled wedge can be laterally biased with the spring, thereby laterally moving the angled wedge to move the movable adjustment member and the adjustable roller upwardly against the top rail race surface with mechanical advantage for self compensating for play.

In another embodiment, the biasing arrangement can be a torsional spring and the mechanical advantage pushing member can be a rotatable threaded self adjusting screw. The movable roller portion can include a movable adjustment member to which the adjustable roller is rotatably mounted. The movable adjustment member can be a pivoting arm to which the adjustable roller can be positioned at one end, and the opposite end can be engaged by the self adjusting screw. The self adjusting screw can be torsionally biased by the torsional spring, thereby rotationally moving the self adjusting screw with axial advancement to move the pivoting arm and the adjustable roller upwardly against the top rail race surface with mechanical advantage for self compensating for play.

In another embodiment, the biasing arrangement can be a torsional spring and the mechanical advantage pushing member can be a rotatable cam that is torsionally biased with the torsional spring. The torsional spring can rotatably bias the cam against a bearing surface associated with the at least one adjustable roller, thereby providing lateral movement of the at least one adjustable roller against rail race surfaces with mechanical advantage for self compensating for play.

In another embodiment, the at least one fixed position roller can engage lower rail race surfaces and the at least one adjustable roller can engage upper rail race surfaces. The biasing arrangement can be a torsional spring and the mechanical advantage pushing member can be a rotatable threaded self adjusting nut that is rotatably mounted to a threaded screw. The torsional spring can rotatably bias the self adjusting nut downwardly against the at least one adjustable roller, thereby providing downward movement of the at least one adjustable roller against the upper rail race surfaces with mechanical advantage for self compensating for play.

In some embodiments, the motion device can further include a linear rail and a rotatable lead screw extending along a longitudinal axis can be mounted to the rail for driving the carriage along the rail. The carriage can include axially spaced first and second partial follower nuts having respective first and second thread forms for engaging mating threads on the lead screw. The first partial follower nut can be biased against the lead screw in a direction transverse to the longitudinal axis with a first nut transverse self adjustment mechanism for removing backlash. The second partial follower nut can be biased against the lead screw in a direction transverse to the longitudinal axis with a second nut transverse self adjustment mechanism for removing backlash. The second partial follower nut can be further biased against the lead screw axially along the longitudinal axis relative to the first partial follower nut, with a second nut axial self adjustment mechanism for removing backlash during high load or high acceleration operation.

In particular embodiments, the second partial follower nut and second nut transverse self adjustment mechanism can be housed within a slide block. The slide block can be axially slidably mounted within an axial slot within the carriage. The slide block and the second partial follower nut can be axially biased within the axial slot, and relative to the first partial follower nut, with the second nut axial self adjustment mechanism.

In some embodiments, the rail can be engaged with four fixed position rollers and four adjustable rollers positioned between the fixed position rollers. In some embodiments, the biasing arrangement can be a torsional spring for rotating the mechanical advantage pushing member. The mechanical advantage pushing member can be rotated causing advancement of the mechanical advantage pushing member against the movable roller portion for causing movement of the movable roller portion and the adjustable roller with mechanical advantage for self compensating for the play. In some embodiments, the mechanical advantage pushing member can be a threaded nut. A torsional spring can rotate the threaded nut for advancing the threaded nut against the adjustable roller for moving the adjustable roller with mechanical advantage. In some embodiments, the rail can be a linear rail including rail race surfaces that the fixed position and adjustable rollers can engage from generally opposite sides. In some embodiments, the mechanical advantage pushing member can include a rotatable cam. The rotatable cam can be rotated with a torsional spring for advancing surfaces of the cam against the movable roller portion for moving the movable roller portion and the adjustable roller with mechanical advantage.

The present invention can also provide a method of removing backlash associated with a rotatable lead screw in a motion device. The motion device can have a carriage slidably mounted to a linear rail for travel along the rail. The carriage can be driven by a rotatable lead screw extending along a longitudinal axis and mounted to the rail. The carriage can include axially spaced first and second partial follower nuts having respective first and second thread forms for engaging mating threads on the lead screw. The first partial follower nut can be biased against the lead screw in a direction transverse to the longitudinal axis with a first nut transverse self adjustment mechanism for removing backlash. The second partial follower nut can be biased against the lead screw in a direction transverse to the longitudinal axis with a second nut transverse self adjustment mechanism for removing backlash. The second partial follower nut can also be biased against the lead screw axially along the longitudinal axis relative to the first partial follower nut with a second nut axial self adjustment mechanism for removing backlash during high load or speed, or high acceleration operation.

In particular embodiments, the second partial follower nut and the second nut transverse self adjustment mechanism can be housed within a slide block. The slide block can be axially slidably mounted within an axial slot within the carriage. The slide block and the second partial follower nut can be axially biased within the axial slot, and relative to the first partial follower nut with the second nut axial self adjustment mechanism. The second nut axial self adjustment mechanism can include a mechanical advantage threaded member axially connected to the slide block. The mechanical advantage threaded member can be rotationally biased by a torsional spring for axially biasing the slide block with mechanical advantage. In another embodiment, the second nut axial self adjustment mechanism can include a mechanical advantage angled wedge that engages across an axial end of the slide block. The mechanical advantage angled wedge can be biased with a spring for axially biasing the slide block with mechanical advantage. The slide block and the second partial follower nut can be biased at least one of towards and away from the first partial follower nut for removing backlash. In some embodiments, the carriage can have at least one rotatable fixed position roller and at least one rotatable adjustable roller that roll on mating rail race surfaces of the rail. The at least one adjustable roller can be moved relative to the at least one fixed position roller for self compensating for play between the rollers and the mating rail race surfaces of the rail. Each at least one adjustable roller can be part of a movable roller portion movably mounted to the carriage. The movable roller portion can be adjustably movable by a self adjustment mechanism. The self adjustment mechanism can include a mechanical advantage pushing member capable of movably engaging the movable roller portion. The mechanical advantage pushing member can be resiliently biased against the movable roller portion by a biasing arrangement. The biasing arrangement can be capable of causing movement of the mechanical advantage pushing member and the movable roller portion for moving the adjustable roller for self compensating for the play.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 6 is an exploded perspective view of an embodiment of a second partial follower nut assembly.

DETAILED DESCRIPTION

A description of example embodiments follows.

Figure 1:
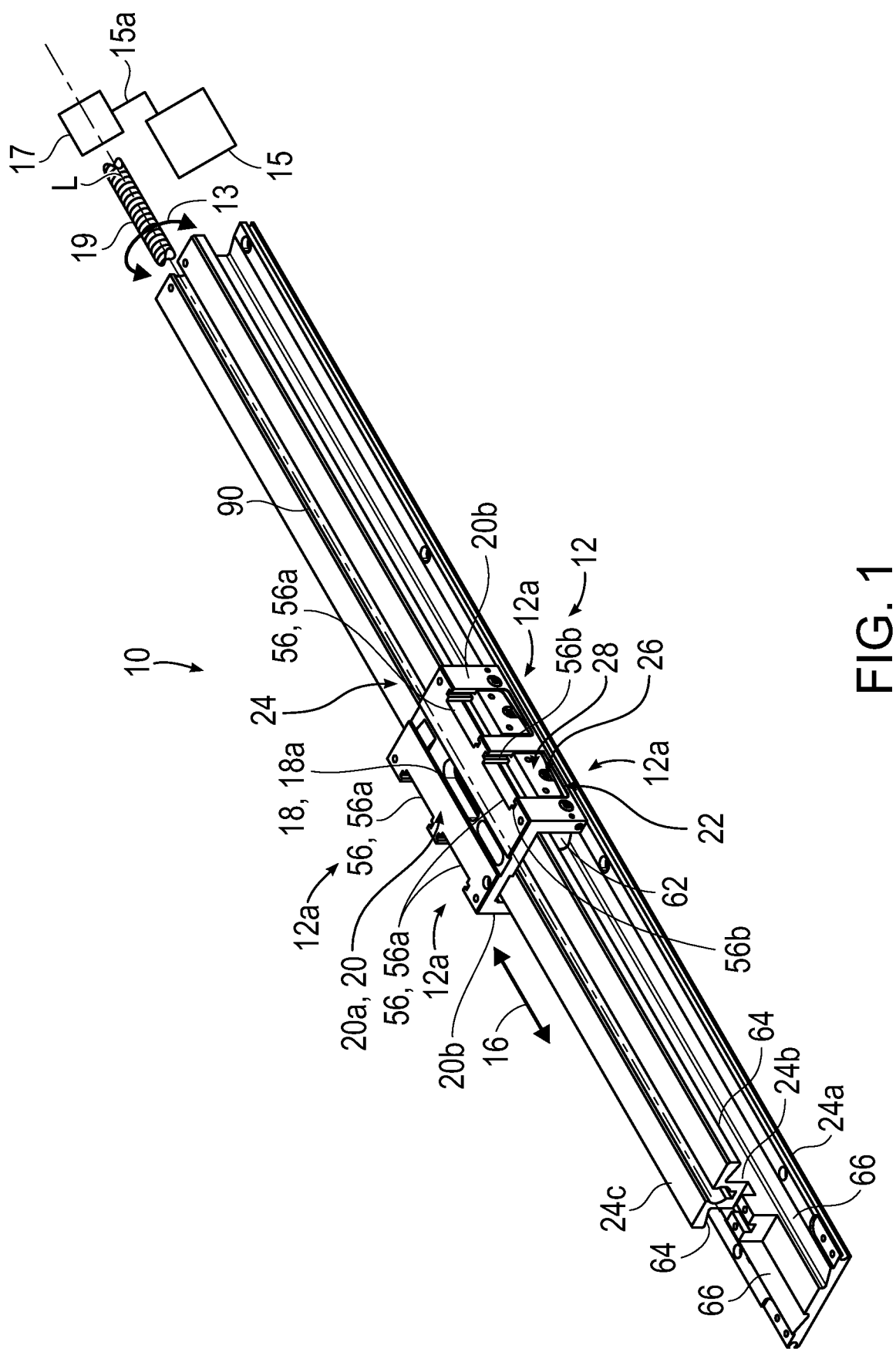
FIG. 1 is a perspective view of an embodiment of a motion device in the present invention.

Referring to FIG. 1, an embodiment of a linear motion slide or guide system, mechanism or device 10 in the present invention can include a linear rail or slide 24, on which a load bearing guide carriage 20 is slidably or rollably mounted, and onto which desired tools or components can be attached or secured. A rotatable lead screw 19 extending along a longitudinal axis L can be rotatably mounted to the rail 24 for driving the carriage 20 back and forth linearly in the direction of arrows 16 along rail 24. The lead screw 19 can be rotationally driven in either direction of arrows 13 by a motor 17, which can be controlled by a controller 15 via line 15A. A follower nut or follower nut arrangement 18 can be positioned within a slot 18a in the top of the carriage 20 for engaging the lead screw 19, allowing the carriage 20 to be driven.

Referring to FIGS. 1-4C, the carriage 20 can have one or more fixed position low friction bearing or sliding elements, such as rotatable elements, bearings, wheels or rollers 62, and one or more adjustable position low friction bearing or sliding elements, such as rotatable elements, bearings, wheels or rollers 30, rotatably mounted to the carriage 20 for rotatably engaging mating rail engagement, bearing, or race surfaces 66 and 64 of the rail 24, thereby providing low friction sliding or rolling engagement on the rail 24. In embodiments of the motion device 10, the follower nut arrangement 18 can have features for self compensating for backlash with the lead screw 19, and the adjustable position rollers 30 can have features for self compensating for play between the rollers 62/30 with the rail race surfaces 66/64 preventing or minimizing pitch, roll and yaw of carriage 20 relative to rail 24, for providing precision movement and positioning of the carriage 20 along rail 24.

The rail 24 can have a generally I-beam cross-section with a base or bottom flange portion 24a (FIG. 4A), an upright central intermediate or middle web portion 24b, and an upper or top flange portion 24c. The bottom flange portion 24a can have two parallel linear elongate bottom rail engagement, bearing or race surfaces 66 extending linearly on opposite sides of the central web portion 24b, facing upwardly and angled or curved slightly inwardly toward the top flange portion 24c moving in the laterally outward direction. The top flange portion 24c can have two parallel linear elongate upper or top rail, engagement, bearing or race surfaces 64 extending linearly on opposite sides of the central web portion 24b, facing downwardly and angled or curved slightly inwardly toward the bottom flange portion 24a moving in the laterally outward direction. In some embodiments, the race surfaces 64 and 66 can be each angled at about 15°. Consequently, on each lateral side of the rail 24, there can be a bottom race 66 and a top race 64 that generally angle towards each other moving laterally outwardly. The rollers 62 and 30 can be angled, frustoconical, generally conical, or curved rollers, to mate with races 66 and 64, for example also at 15°, with the larger diameter portion being positioned laterally inwardly from the smaller diameter portion relative to rail 24. Rollers 62 and 30 can be formed of metal, steel, ceramics, polymers such as Delrin or other suitable materials including composite materials. An elongate slot or channel 90 can extend through the top flange portion 24c, in which the lead screw 19 can be rotatably mounted along the longitudinal axis L.

The carriage 20 can have a generally channel shape that faces downwardly (FIG. 4B), and can have a top or upper portion 20a, and two side or side portions 20b. The top portion 20*a* can extend over the top flange portion 24*c* of rail 24, with sides 20*b* extending downwardly therefrom toward the bottom flange portion 24*a*. Four fixed position rollers 62 can be rotatably mounted to the carriage 20 about axes 61 with fixed axles or shafts 60. The fixed position rollers 62 can be mounted to the ends of each side 20*b*, at about the four corners of the carriage 20 for rotatably engaging or rolling on or against the two parallel bottom races 66. Four self adjustable position rollers 30 can be rotatably mounted to the carriage 20 about axes 27 with axles or shafts 26, for rotatably engaging or rolling on or against the two parallel top races 64. The position of the adjustable position rollers 30 are self adjustable by a self adjustment mechanism to remove play between the rollers 62/30 and races 66/64. The adjustable position rollers 30 can be adjustably positioned to the sides 20*b* of the carriage 20 between the fixed position rollers 62, with two adjustable position rollers 30 being between two fixed position rollers 62 on each side 20*b*.

The adjustable position rollers 30 can be part of a low friction element or roller adjustment system 12 having four low friction element or roller adjustment assemblies 12*a*, where two are positioned on each side 20*b* of the carriage 20 between the fixed position rollers 62 for adjusting position of the adjustable position rollers 30 relative to the fixed position rollers 62, the sides 20*b* of carriage 20, and the rail 24. Each roller adjustment assembly 12*a* can include a movable adjustment member or plate 28 to which an adjustable position roller 30 is rotatably mounted. The adjustable plate 28 can have a generally flat plate body portion 28*a* and two elongate upright or vertical flanges 28*b* extending along the side edges of the body portion 28*a* (FIGS. 3A and 3B). Each side 20*b* of the carriage 20 can have two adjustment plate channels, recesses or slots 56 formed therein for slidably containing an adjustment plate 28 with a single degree of freedom motion, such as up/down sliding or movement. Each slot 56 can have a main channel, recess or slot portion 56*a* (FIG. 2), for engaging and accepting or containing the body portion 28*a* of the adjustment plate 28, and two elongate upright or vertical retention features, channels, recesses or slot portions 56*b* extending from opposite sides of the main slot portion 56*a* for engaging accepting or containing the flanges 28*b* of the adjustment plate 28. This restricts or limits the adjustment plate 28 to up/down sliding movement. The slot 56 can be open on the top and outward lateral side.

Each axle 26 to which an adjustable position roller 30 is rotatably mounted, can have an adjustment plate journal or diameter 48 that can be secured within a hole or opening 28*d* in the adjustment plate 28 with a screw 38 within a counter bore 28*c* (FIGS. 3A and 3B). The screw 38 engages the threaded inner diameter 26*a* of axle 26 to tighten the anti-rotation feature, shoulder or head 42 against adjustment plate 28. The adjustable position roller 30 can have two central bores 30*b* on opposite sides connected by a central hole 30*a* with an annular shoulder, ridge or rib 44 therebetween. The outer diameters or races 32*b* and 34*b* of bearings 32 and 34 can be retained or contained within bores 30*b* against rib 44. Bearings 32 and 34 can be ball bearings, but can also be other suitable types of bearings, such as plain bearings or bushings. Rib 44 can be a shoulder within roller 30 or can be a separate part. The adjustable position roller 30 can be rotatably mounted to the journal or diameter 40 of axle 26 with the inner diameters or races 32*a* and 34*a* of bearings 32 and 34 thereon, which are secured with screw 36 within threaded inner diameter 26*a* against inner race feature 46. Screw 36 can be tightened in a manner to preloaded bearings 32 and 34 to remove clearance therebetween.

Figure 2:
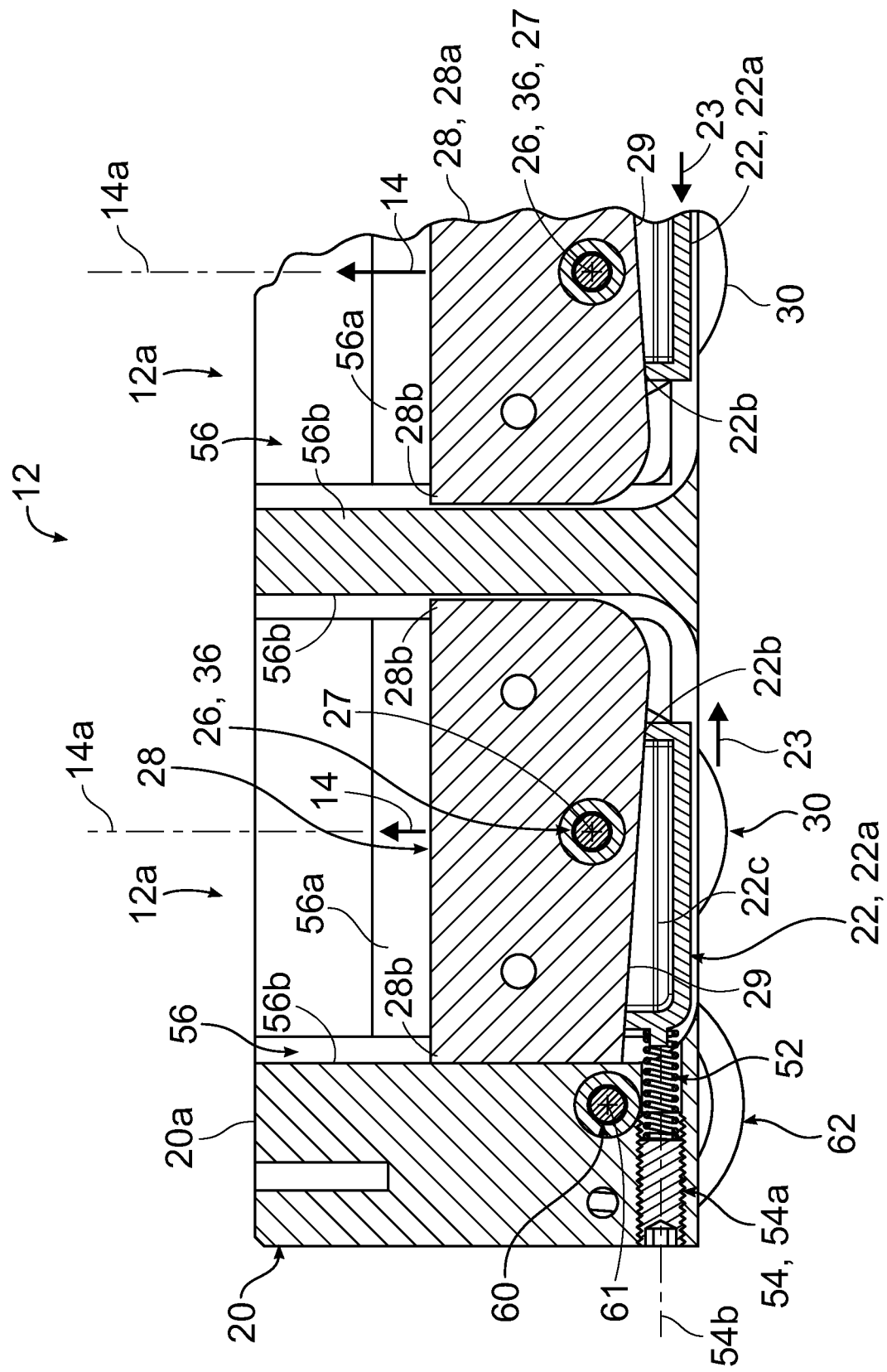
FIG. 2 is a section view of a portion of an embodiment of a carriage of a motion device in the present invention.
Figure 3A:
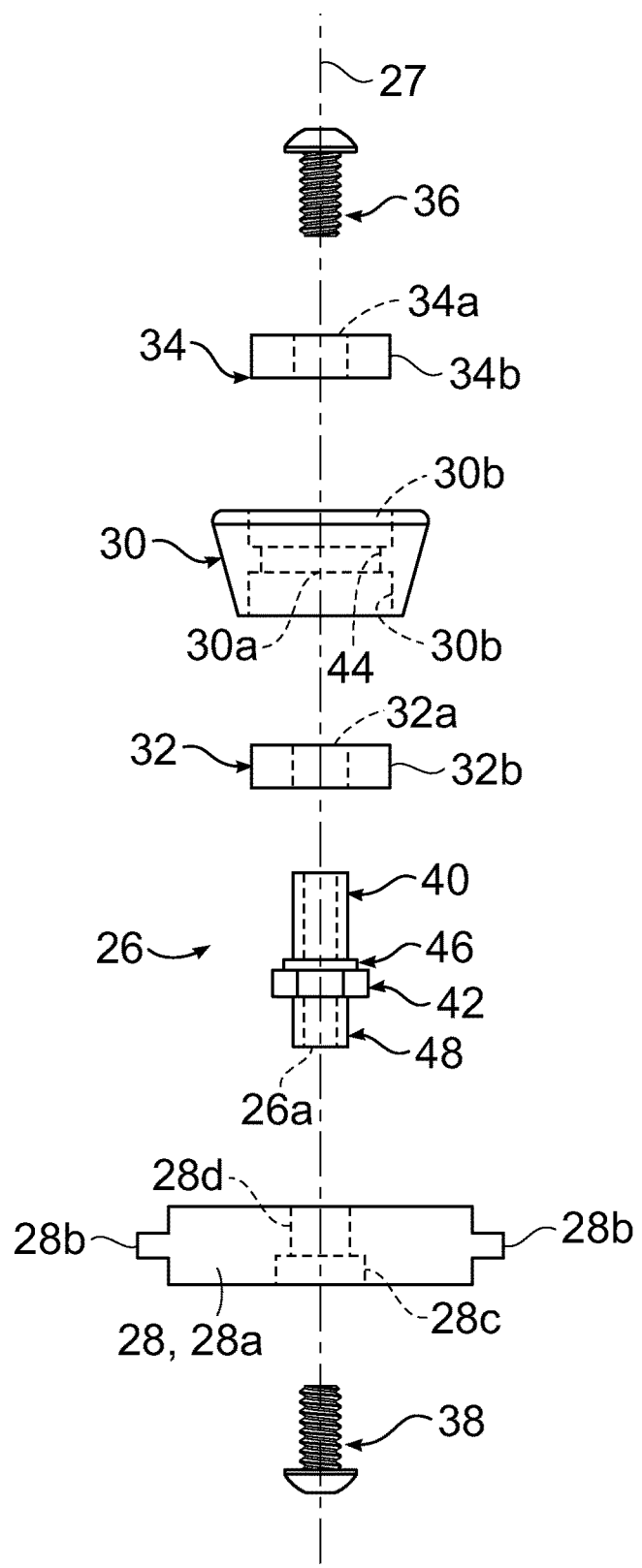
FIG. 3A is an exploded view of an embodiment of an adjustable roller arrangement.
Figure 3B:
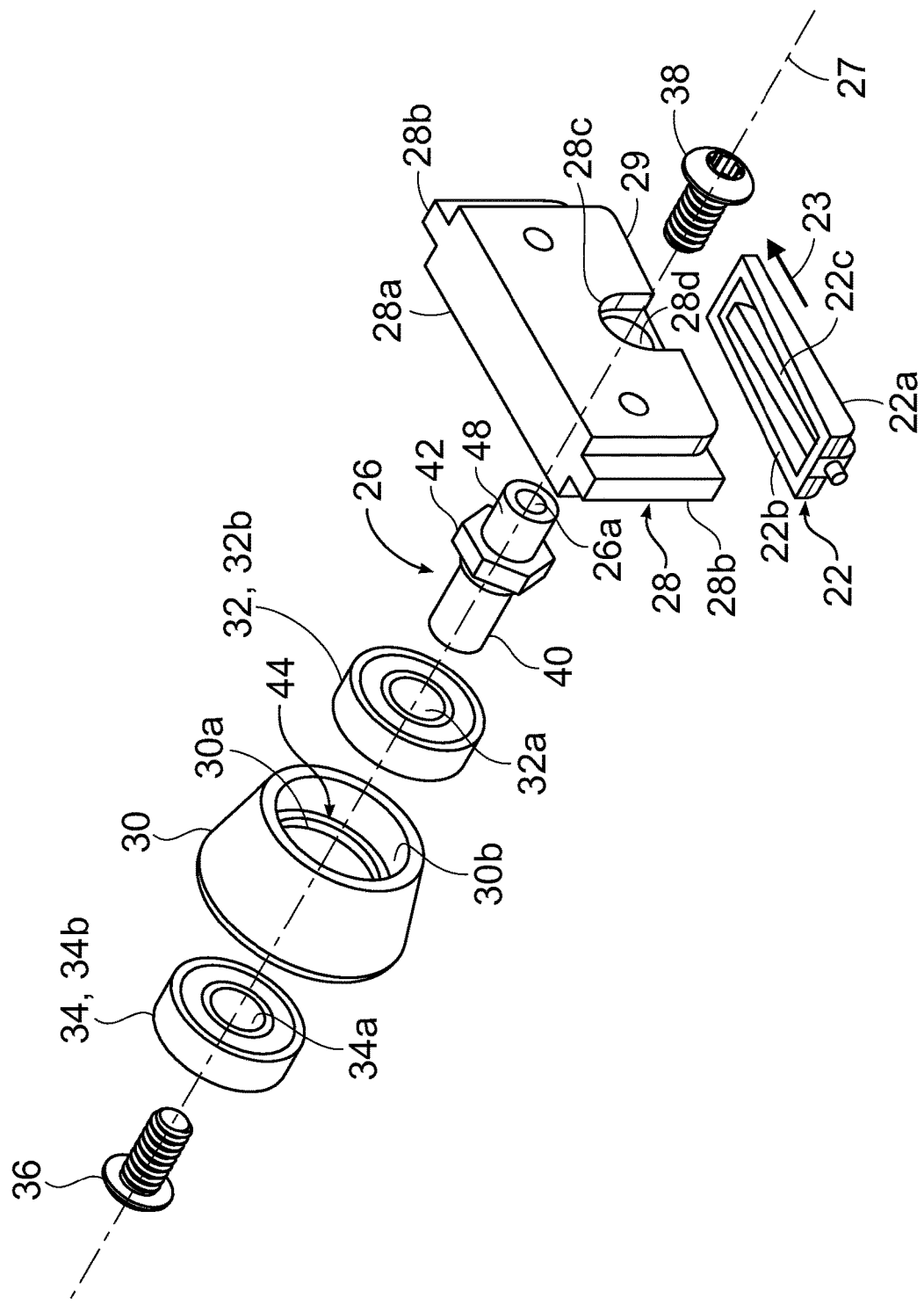
FIG. 3B is an exploded perspective view of an embodiment of an adjustable roller arrangement.
Figure 4A:
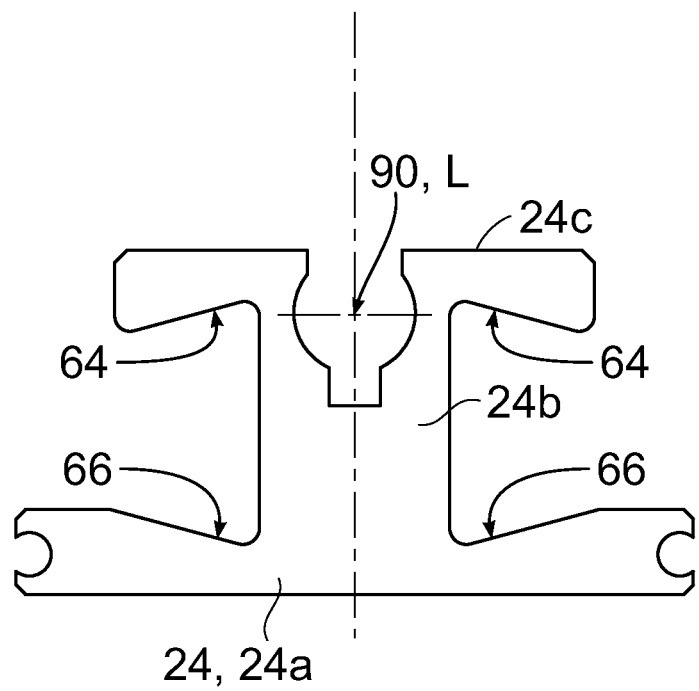
FIG. 4A is an end view of an embodiment of a rail shown in FIG. 1.
Figure 4B:
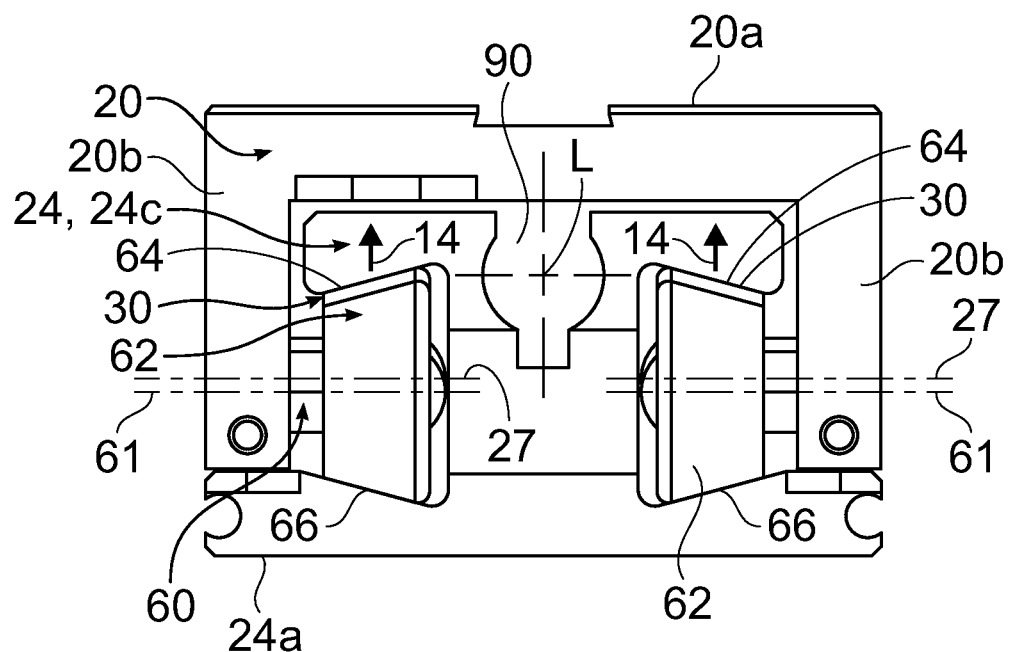
FIG. 4B is an end view of an embodiment of a carriage mounted to the rail of FIG. 4A.
Figure 4C:
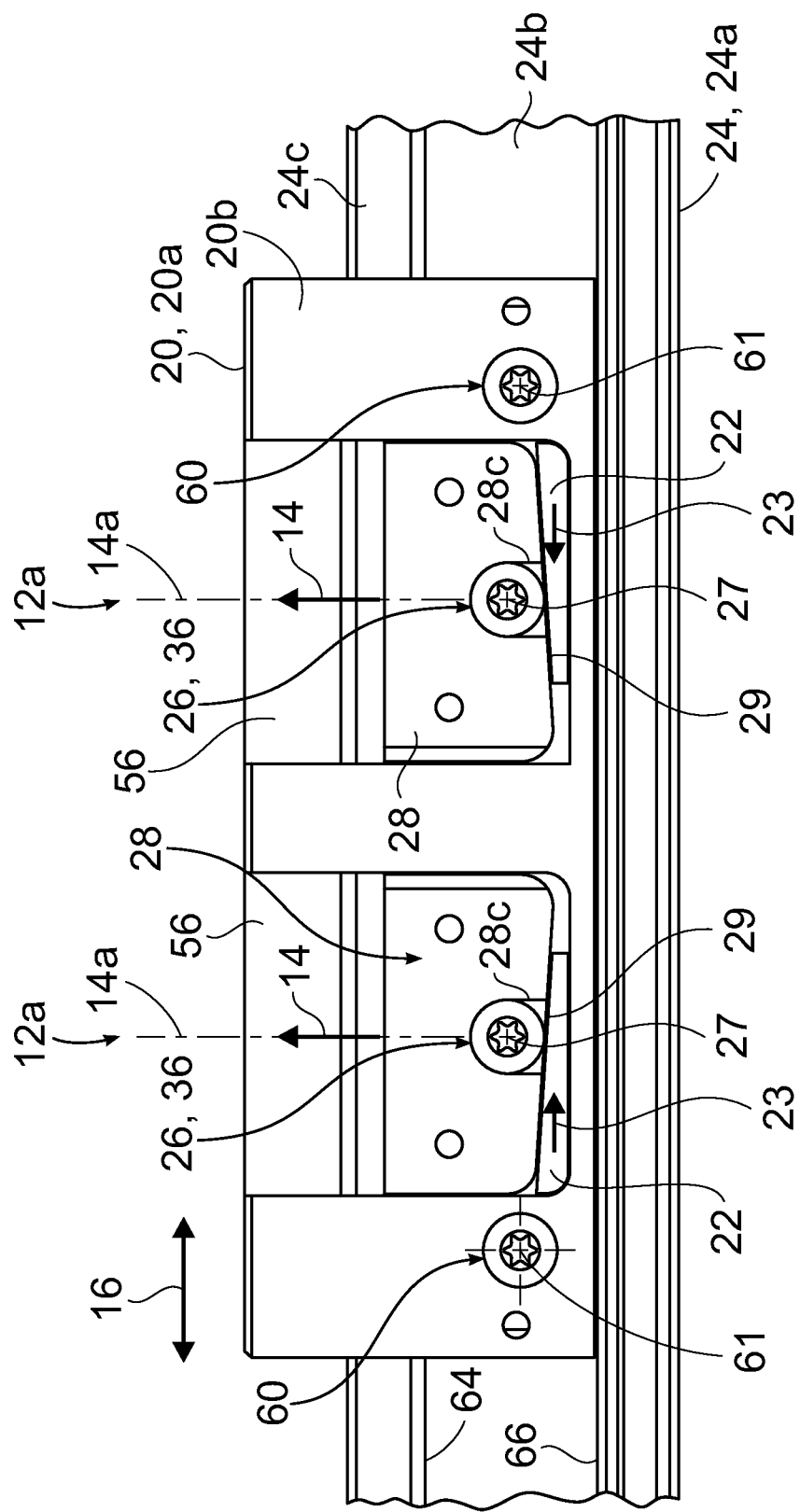
FIG. 4C is a side view of the carriage of FIG. 2 on a portion of the rail.
Figure 5A:
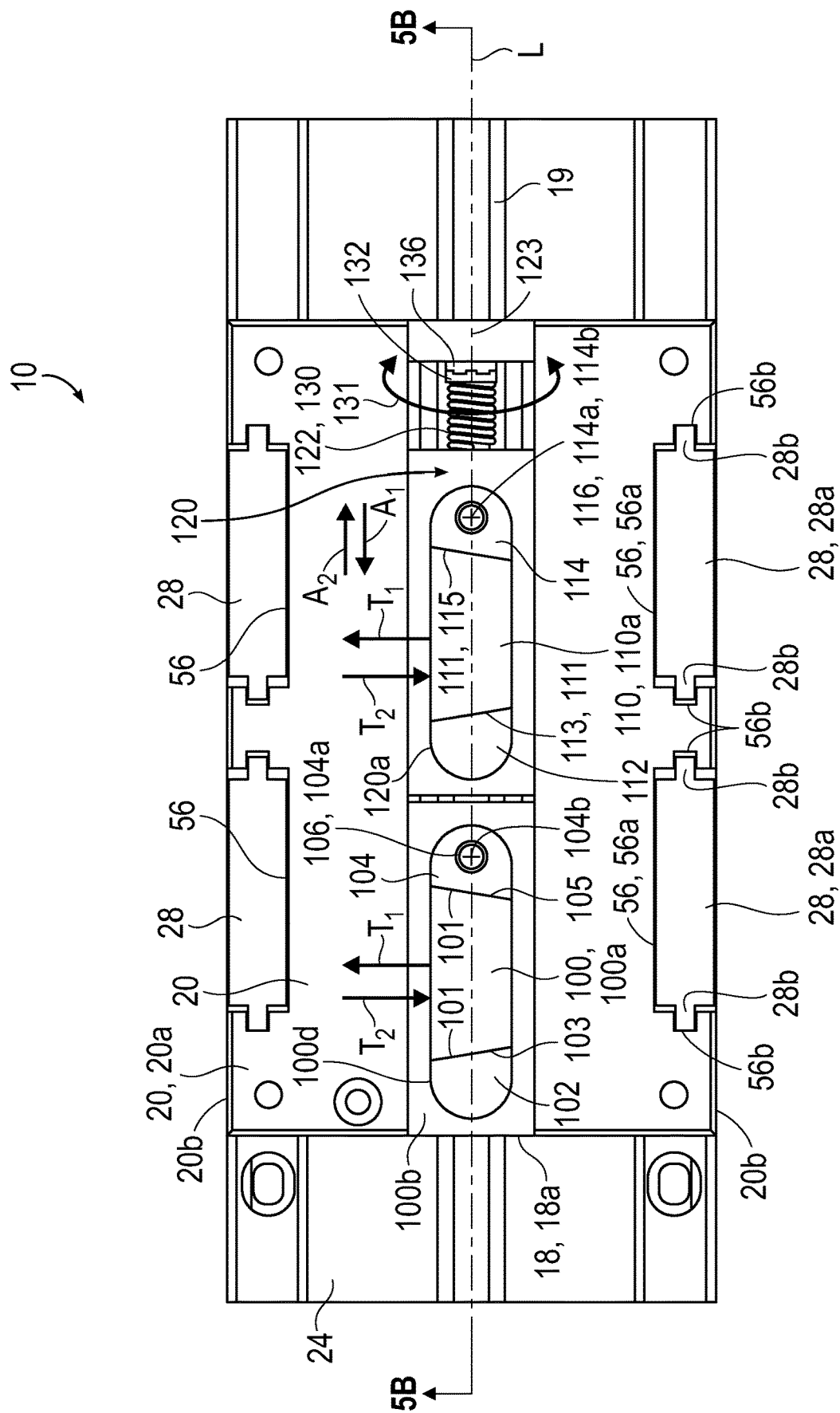
FIG. 5A is a top view of an embodiment of a motion device in the present invention with the carriage on a portion of a rail showing an embodiment of a follower nut arrangement.
Figure 5B:
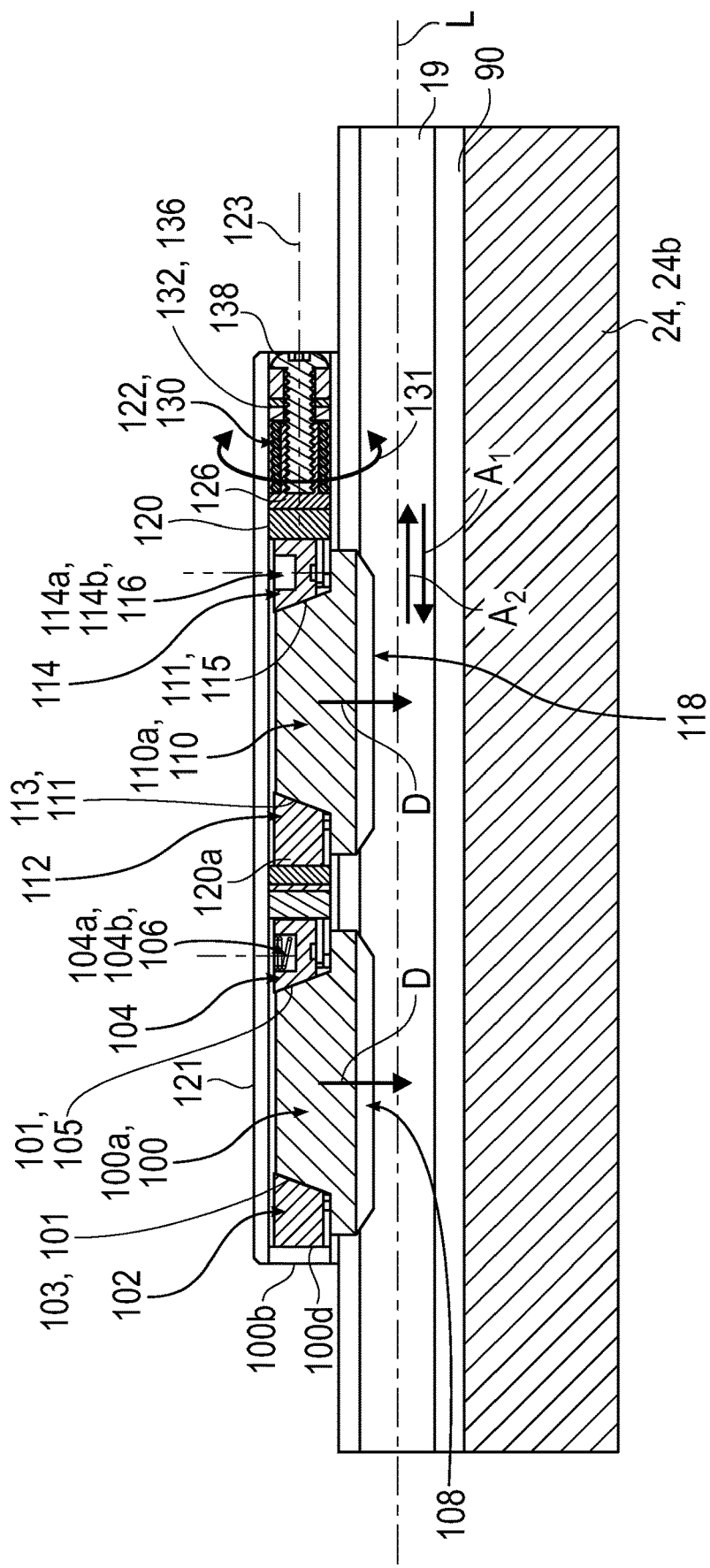
FIG. 5B is a section view of an embodiment of a follower nut arrangement engaging the lead screw.
Figure 5C:
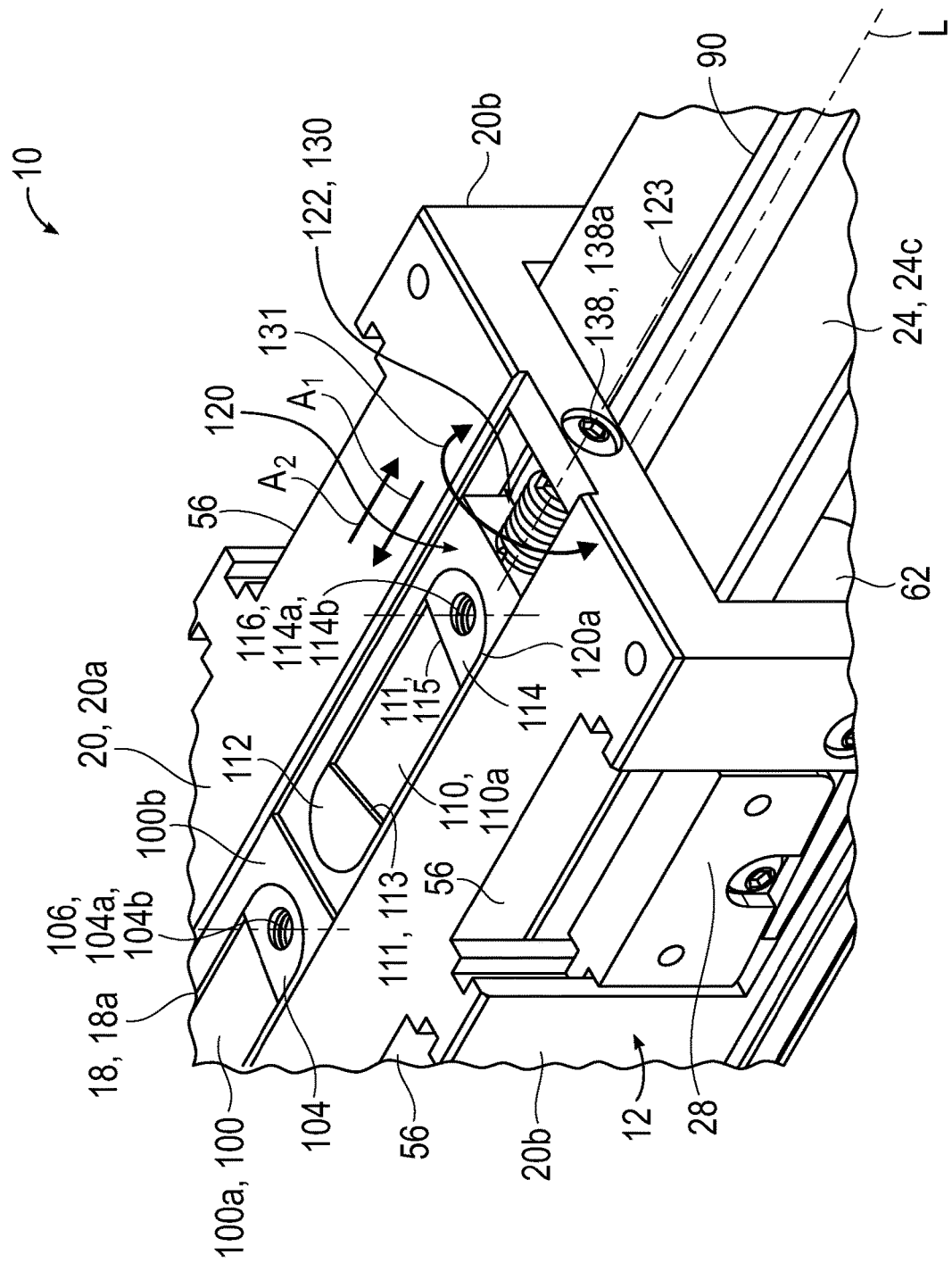
FIG. 5C is a perspective view of a portion of the embodiment of the carriage and rail in FIG. 5A.
Figure 7:
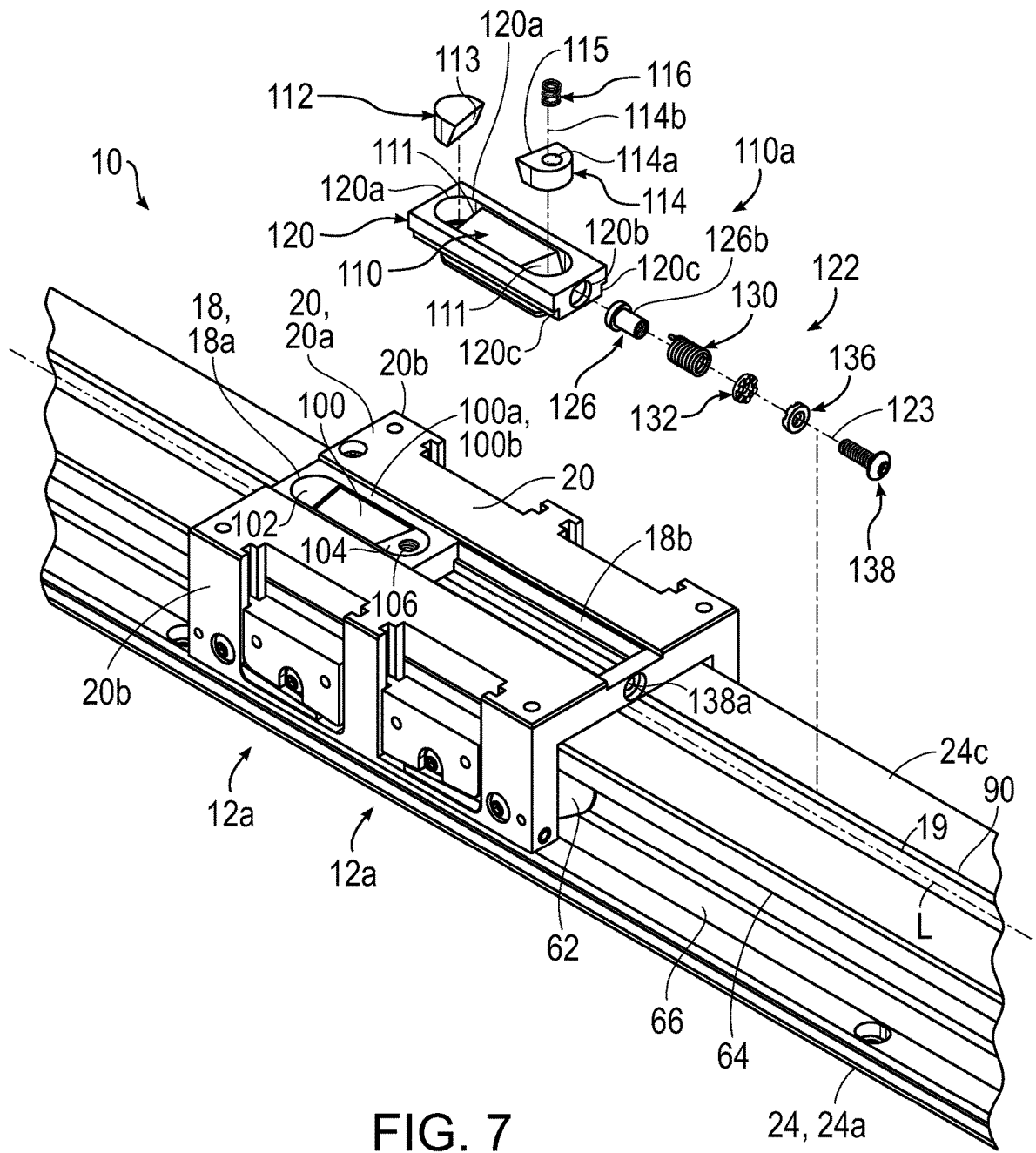
FIG. 7 is a perspective view of the embodiment of the motion device of FIG. 5A with an exploded view of the second partial follower nut assembly.

Referring to FIGS. 2, 3A and 4C, each adjustment plate 28 can have a slightly angled bottom bearing or engagement lift surface 29, that angles slightly upwardly moving towards the axial end of carriage 28, for example at 5°, so that the vertical material dimentsion height of the adjustment plate 28 is higher on the inward side and lower on the outward side toward the axial end of the carriage 20. An angled sliding mechanical advantage pushing, urging, advancing or moving member or lift wedge 22 can be positioned in the bottom of each slot 56 and have a flat bottom 22*a* and a slightly angled top or upper bearing or engagement lift surface 22*b* for engaging the bottom lift surface 29 of adjustment plate 28. The wedge 22 can be made of a low friction material such as suitable polymers, and can have a recess 22*c* in the upper surface, which can contain lubricant, such as oil or grease for reducing friction. The wedge 22 can be angled an equal amount as the bottom lift surface 29 of the adjustment plate 28 (5°) but in the opposite direction, angling downwardly inwardly moving away from the axial end of the carriage 20, so that the height of the lift wedge 22 is higher on the outward side toward the axial end of the carriage 20, and lower on the inward side. Lateral inward movement of the lift wedge 22 in direction 23 within slot 56 under the adjustment plate 28 (parallel to the longitudinal axis L) can move or lift adjustment plate 28 and adjustable position roller 30 upwardly within slot 56 in the direction of arrow 14 normal or perpendicular to axles 60 and 26 with mechanical advantage along axis 14*a*, as the opposing angled lift surfaces 29 and 22*b* slide relative to each other, moving to the higher portions of the lift wedge 22 and the adjustment plate 28.

The lift wedge 22 can be preloaded or biased against the bottom lift surface 29 of the adjustment plate 28 with a biasing arrangement such as a compression coil spring 52 that is locked in place and preloaded with an adjustment screw 54. The spring 52 and adjustment screw 54 can be positioned within a hole 54*a* and a laterally aligned with lift wedge 22 along a lateral axis 54*b* (FIG. 2). The preload spring 52 can be adjusted by adjusting the adjustment screw 54 within the threaded portion of the hole 54*a*. As a result, the preload spring 52 laterally biases the lift wedge 22 laterally in the direction of arrow 23 against the bottom lift surface 29 of the adjustment plate 28. This also biases the adjustment plate 28 and the adjustable position roller 30 upwardly against upper rail race 64 and in the direction of arrow 14. As a result, if there is incremental wear that would normally cause play or clearance between the rollers 62/30 and the rail races 66/64, the lift wedge 22 can be moved incrementally laterally in the direction of arrow 23 by spring 52. This incrementally moves the adjustment plate 28 and adjustable position roller 30 upwardly in direction of arrow 14 along axis 14*a* with mechanical advantage in a self adjusting manner for maintaining engagement of roller 30 with upper rail race 64 to prevent play of the rollers 62/30 with rail races 66/64 that would cause play of the carriage 20 relative to the rail 24. In one embodiment, when the lift surface 22*b* of lift wedge 22 is angled at 5°, there can be a mechanical advantage ratio about 11.4 to 1, where the lift wedge 22 moves laterally 11.4 times further than the adjustment plate 28 and adjustable position roller 30 moves upwardly against the upper rail race 64. This can tightly position the adjustable position roller 30 with minimal preload force from spring 52 without experiencing back driving of the lift wedge 22 during use, which can minimize wear of the rail 24, rollers 62/30 and axles 60 and 26, for increased life of the dynamic components.

Since there are four adjustable position rollers 30, with two rollers 30 positioned next to each other on each side 20b of carriage 20 adjacent to and between the fixed position rollers 62, collectively the four adjustable position rollers 30 can be simultaneously incrementally forced upwardly with mechanical advantage in a self adjusting manner against upper races 64 of rail 24 which at the same time forces or pushes and tightens the four fixed roller 62 downwardly against the lower races 64 in the opposite direction, removing play. This can allow the carriage 20 to consistently slide or roll along rail 24 with precision due to automatic wear compensation.

In some embodiments, the angle of the lift wedge 22 can vary to provide other mechanical advantage ratios, for example 6:1, 8:1 and 10:1. Lower mechanical advantage ratios may be used and different geometries and material selected in some embodiments for allowance back driving of the lift wedge 22, such as to prevent damage to the components. In some embodiments, the biasing arrangement can include other suitable items such as a gas or fluid spring or resilient compressible material.

The angled frustoconical or generally conical shaped rollers 62 and 30 and mating angled rail races 66 and 64 can cause a reactionary force vector that can be modeled as two individual force vectors normal to and on axis 27 with the axles 26 of the adjustable position rollers 30. As a result, the motion of adjustment plate 28 and rollers 30 upwardly in the direction of arrow 14 can achieve wear compensation in the axis normal to and along axis 27 of axles 26. In other embodiments, other geometries and configurations of the rollers 62 and 30 and rail 24 can be employed. Although rollers 62 and 30 have been described as rotating relative to fixed axles 60 and 26, in some embodiments, the axles 60 and 26 can rotate. In other embodiments, rollers 62 and 30 can be replaced with sliding low friction materials, or linear motion bearing slides.

Referring to FIGS. 5A-8, embodiments of the carriage 20 can have a follower nut arrangement 18 including a first or primary follower nut assembly 100a with a first or primary partial follower nut 100, and a second or secondary follower nut assembly 110a with a second or secondary partial follower nut 110. The follower nuts 100 and 110 can be axially aligned with each other parallel to longitudinal axis L within slot 18a for engagement with lead screw 19, and axially spaced apart.

The first follower nut assembly 100a can have a frame 100b positioned in slot 18a having an internal slot or recess 100d with rounded axial ends. Alternatively, recess 100d can be formed in the body of the carriage 20. The recess 100d can contain the first partial follower nut 100, and angled mechanical advantage biasing wedges 102 and 104 having rounded axial ends positioned on opposite axial ends of the first partial follower nut 100. The first partial follower nut 100 can have opposite upper axial end biasing wedge surfaces 101 that are angled in both the lateral and vertical directions relative to longitudinal axis L laterally and upwardly towards each other, and can also have a lower portion with first or primary partial threads 108 for engaging the top of lead screw 19. Wedge 102 can have a biasing wedge surface 103 that is angled laterally and downwardly for complementary mating with and slidably engaging one end surface 101 of partial follower nut 100. Wedge 104 can also have a biasing wedge surface 105 that is angled laterally and downwardly for complementary mating with and slidably engaging the opposite end surface 101. The wedge 104 can be a preloading biasing wedge, and include a resilient biasing member such as a coil compression preload spring 106 positioned within a partial depth hole or a blind hole 104a in wedge 104 along vertical axis 104b. A cap 121 secured to the top portion 20a of the carriage 20 over the follower nut arrangement 18 can downwardly compress and preload spring 106 within wedge 104 against the bottom of blind hole 104a. This forces the wedge 104 downwardly, and since the lateral and axial positions of wedges 102 and 104 are constrained by frame 100b, the angled surface 105 of wedge 104 against angled surface 101 of the first partial follower nut 100 resiliently biases and moves the first partial follower nut 100 downwardly or transversely radially in the direction of arrow D (FIGS. 5B and 8) relative to lead screw 19 and longitudinal axis L, and at the same time laterally or transversely in the direction $T_1$ (FIGS. 5A and 8) relative to lead screw 19 and longitudinal axis L. The sides or flanks of threads or teeth 100c of the first partial threads 108 are biased against the sides or flanks of the threads or teeth 19a of the lead screw 19 for removing backlash or clearance between the first partial follower nut 100 and the lead screw 19. The angled surface 103 of wedge 102 against the angled surface 101 at the opposite axial end of the first partial follower nut 100 provides or allows symmetrical biasing and movement thereof. In one embodiment, angled surfaces 101, 103 and 105 can be angled 10° to lateral and 20° to vertical to provide mechanical advantage in biasing the first partial follower nut 100.

The spring 106, wedges 102, 104 and nut 100, can form a first nut transverse self adjustment mechanism. Under light to moderate loading of carriage 20, biasing or preloading the first partial threads 108 of the first partial follower nut assembly 100a radially into the top of lead screw 19 is sufficient for removing clearance between the first partial follower nut 100 and the lead screw 19 for maintaining adequate wear compensation. However, for high loads on carriage 20 or high rates of acceleration, on long lead screw spans, the addition of a preloaded second follower nut assembly 110a improves anti-backlash and maintaining zero clearance between the follower nut arrangement 18 and the lead screw 19 for long life applications where excessive wear can cause increased clearance and backlash in the motion device 10.

The second follower nut assembly 110a can be similar to the first follower nut assembly 100a, and can include a slide frame or block 120 positioned in slot 18a with shoulders 120c engaging shoulders 18b. The slide block 120 can have an internal slot or recess 120a with rounded axial ends, containing the second partial follower nut 110, and angled mechanical advantage biasing wedges 112 and 114 with rounded axial ends positioned on opposite axial ends of the second partial follower nut 110. The second partial follower nut 110 can have opposite upper axial end biasing wedge surfaces 111 that are angled in both the lateral and vertical directions relative to longitudinal axis L, laterally and upwardly towards each other, and can also have a lower portion with second or secondary partial threads 118 for engaging the top of lead screw 19 in a location axially spaced apart from the first partial threads 108. Wedge 112 can have a biasing wedge surface 113 that is angled laterally and downwardly for complementary mating with and slidably engaging one end surface 111 of second partial follower nut 110. Wedge 114 can also have a biasing wedge surface 115 that is angled laterally and downwardly for complementary mating with and slidably engaging the opposite end surface 111. The wedge 114 can be a preloading biasing wedge, including a resilient biasing member such as a coil compression preload spring 116 positioned within a partial depth hole or blind hole 114a in wedge 114 along vertical axis 114b. The cap 121 can also downwardly compress and preload spring 116 within wedge 114 against the bottom of blind hole 114a. This forces the wedge 114 downwardly, and since the lateral and axial positions of wedges 112 and 114 are constrained by slide block 120, the angled surface 115 of wedge 114 against angled surface 111 of the second partial follower nut 110 resiliently biases and moves the second partial follower nut 110 downwardly or transversely radially in the direction of arrow D (FIGS. 5B and 8) relative to lead screw 19 and longitudinal axis L, and at the same time laterally or transversely in the direction $T_1$ (FIGS. 5A and 8) relative to lead screw 19 and longitudinal axis L. The sides or flanks of the threads or teeth 110c of the second partial threads 118 are biased against the sides or flanks of the threads or teeth 19a of the lead screw 19 for removing backlash or clearance between the second partial follower nut 110 and the lead screw 19. The angled surface 113 of wedge 112 against the angled surface 111 at the opposite axial end of the second partial follower nut 110 provides or allows symmetrical biasing and movement thereof. Surfaces 111, 113, 115 can be the same or similar to surfaces 101, 103 and 105 in the first follower nut assembly 100a. The spring 116, wedges 112, 114 and nut 110 can form a second nut transverse self adjustment mechanism.

Figure 8:
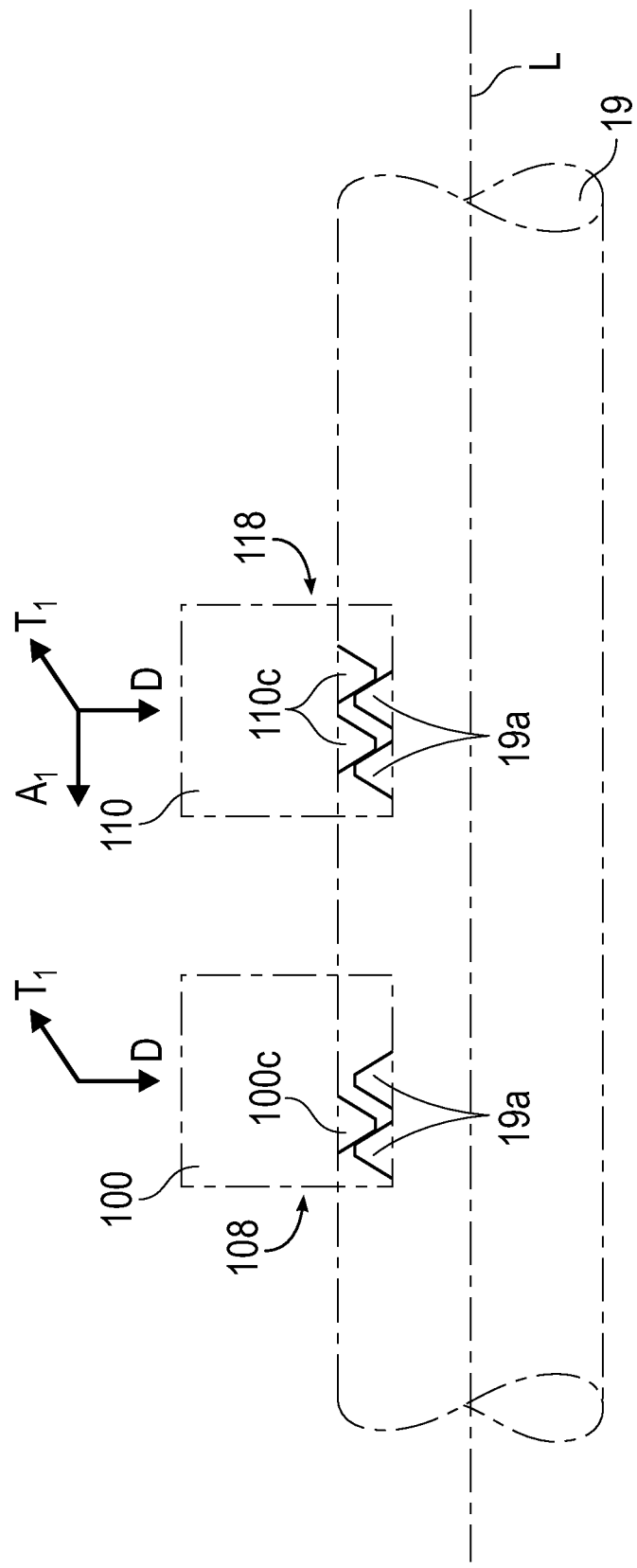
FIG. 8 is a schematic drawing showing the directional biases of embodiments of the first and second partial follower nuts relative to a lead screw for compensating for backlash.

The second follower nut assembly 110a can also include a second nut axial self adjustment mechanism or adjustable spacer 122 for axially biasing and/or moving the slide block 120 along axis 123, parallel to the longitudinal axis L, relative to the first follower nut assembly 100a and the carriage 20. The adjustable spacer 122 can include a spacer member body 126 which is connected to the axial end of slide block 120 at hole 120b, in a manner that allows spacer body 126 to rotate relative to slide block 120. The spacer body 126 is rotationally mounted via threaded hole 126a on a spacer screw 138 that acts as a mechanical advantage threaded member, which extends into slot 18a of carriage 20 from the axial end. The spacer screw 138 extends through hole 138a in the carriage 20, engaging the threaded hole 136a of spacer preload lock member 136 which secures spacer screw 138 in place to the carriage 20. A torsion or torsional spacer preload spring 130 is positioned on or around the shaft portion 126b of the spacer body 126, and the tabs at the opposite ends 130a are secured to the spacer body 126 within a retention hole 128, and to spacer preload spring adjustment member 132 within retention hole 134. The spacer preload spring adjustment member 132 is fitted on spacer screw 138 against spacer preload spring lock member 136. In order to torsionally preload the spring 130, the protrusions 132b of the adjustment member 132 are disengaged from the mating protrusions 136b of the lock member 136, and the adjustment member 132 is rotated to wind the spring 130 to the desired torsional preload, whereby the protrusions 132b are reengaged with the protrusions 136b to rotationally lock the torsional preload in place. The torsional spring 130 provides a rotational or torsional bias in the direction of arrows 131 (FIGS. 5A-5C) to rotate the spacer body 126 on the spacer screw 136 in the rotational direction 131 to axially drive, move or extend the spacer body 126 axially away from the spacer screw 138 with mechanical advantage in the direction of arrow $A_1$. The rotational direction 131 can be either clockwise or counterclockwise depending upon whether the spacer screw 138 and torsion spring 130 are right-handed or left-handed. Since the spacer body 126 is connected to the slide block 120, the slide block 120 and the second partial follower nut 110 are axially biased with mechanical advantage along axis 123 in the direction of arrow $A_1$. This axial bias of the second partial follower nut 110 can provide axial self adjustment in the direction of arrow $A_1$ for removing further backlash or clearance, including during high speed, load or acceleration operation, or for compensating for increased wear, in addition to that provided by the transverse self adjustment provided by wedges 102, 104, 112 and 114, as seen in FIG. 8.

Although FIGS. 5A-5C and 8 are described above for bias or movement in the directions of $T_1$ and $A_1$, in other embodiments, the directional angles of the wedges 102, 104, 112 and 114 and mating surfaces of nuts 100 and 110 can be changed or selected, as well as the helixes of lead screw 19, spacer screw 138 and spring 130 (can be selected between right-hand and left-hand), to change the bias or movement from lateral direction $T_1$ to the opposite lateral direction $T_2$, or to have combinations of $T_1$ and $T_2$ thereof, and to configure the adjustable spacer 122 for providing bias or movement in the opposite axial direction $A_2$.

Figure 9:
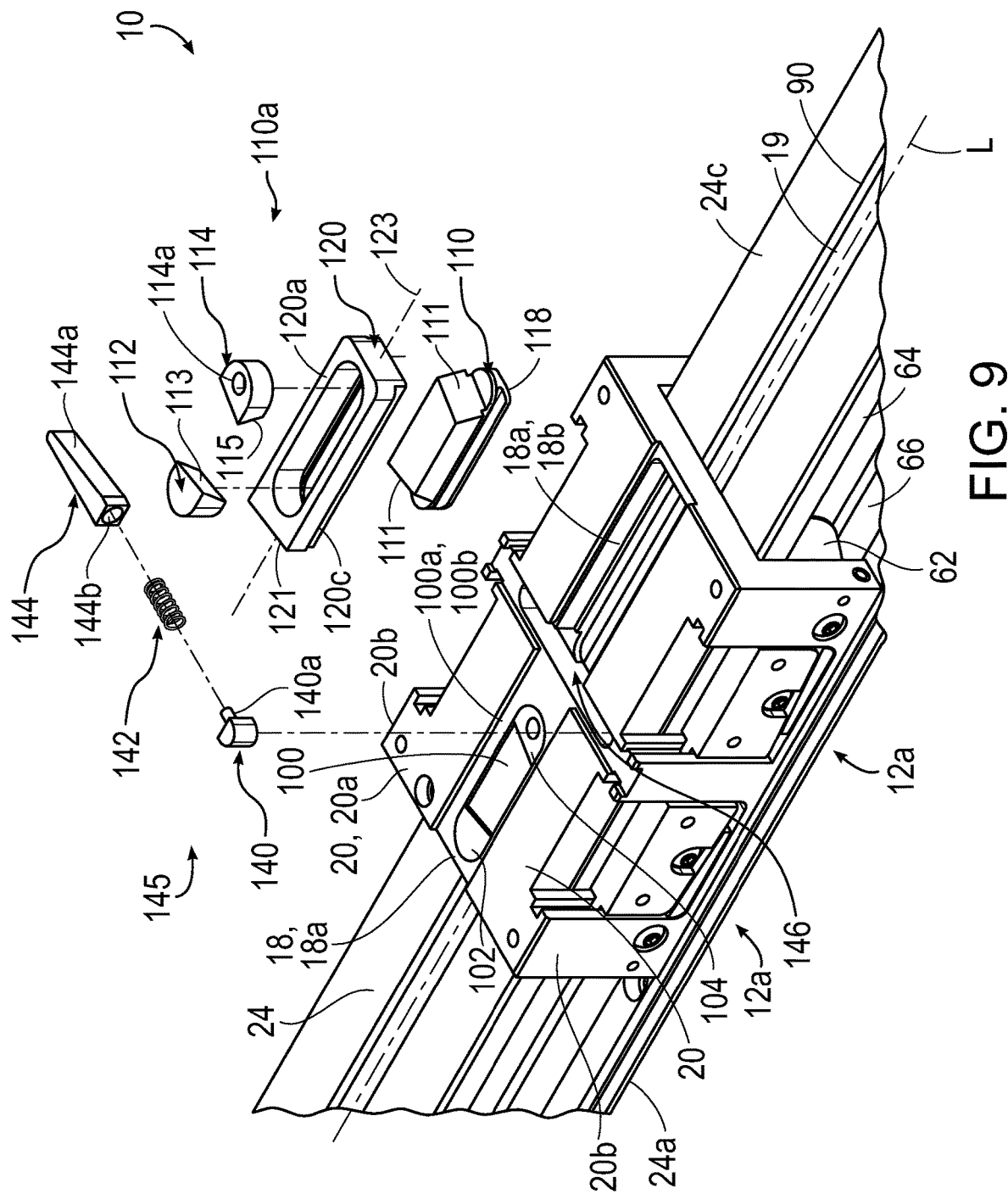
FIG. 9 is a partial exploded view of a portion of another embodiment of a motion device in the present invention, in which the carriage has another second partial follower nut assembly.
Figure 10:
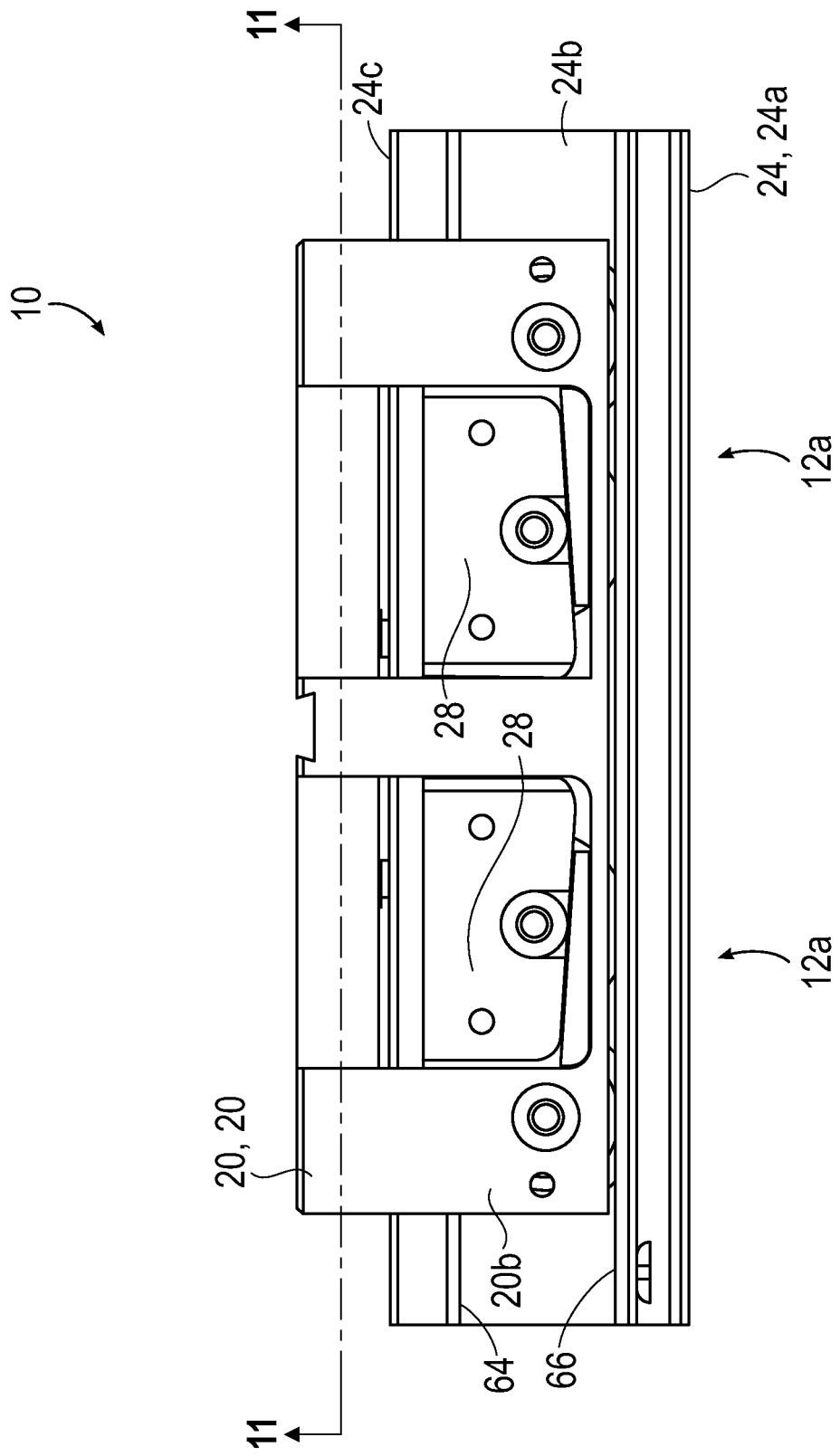
FIG. 10 is a side view of an embodiment of a carriage shown in FIG. 9 on a rail.
Figure 11:
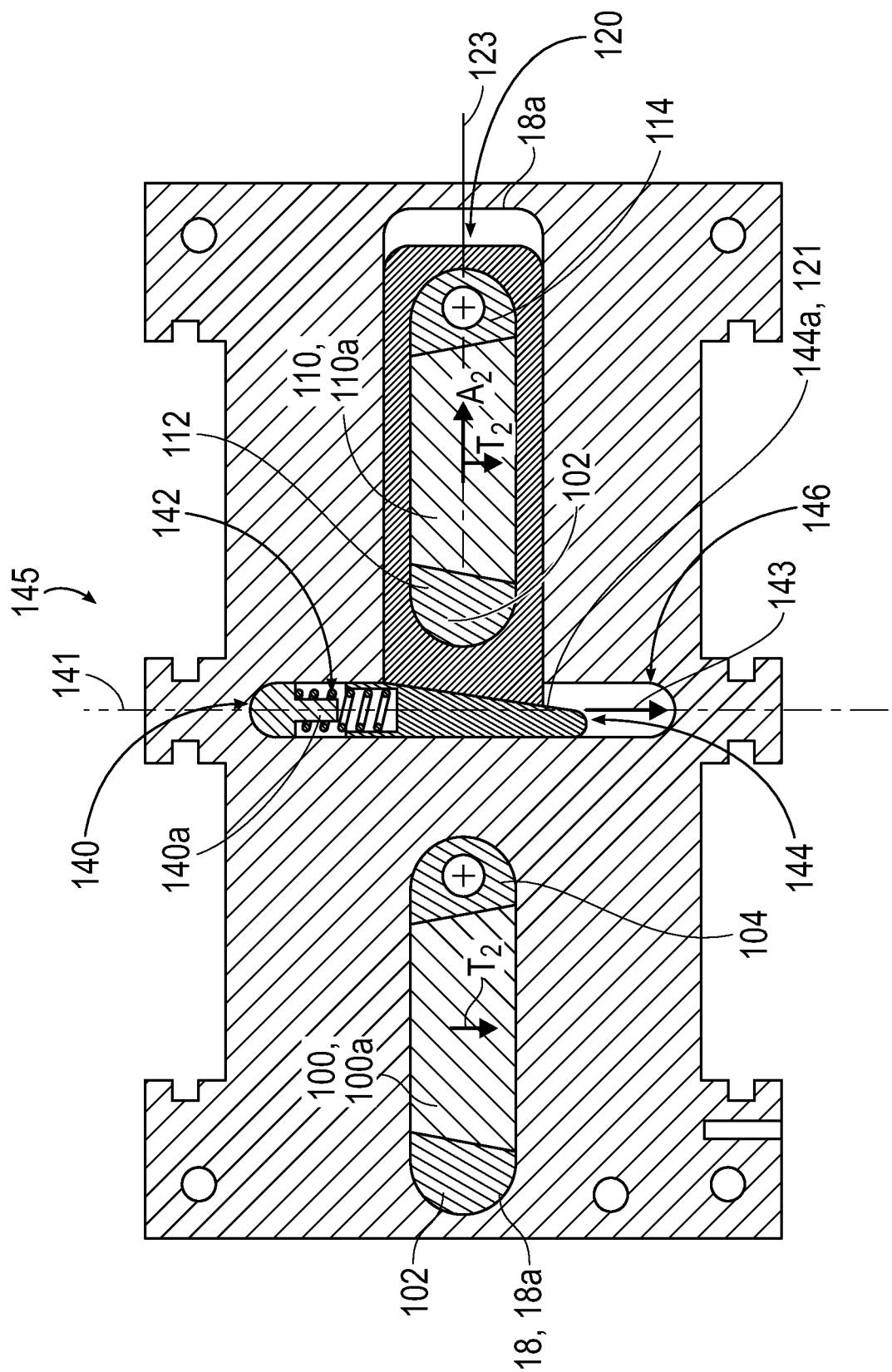
FIG. 11 is a section view of the carriage of FIG. 10 along lines 11-11.

FIGS. 9-11 depict another embodiment of a second nut axial self adjustment mechanism or adjustable spacer 145 in the present invention for axially biasing and moving slide block 120. Adjustable spacer 145 can differ from adjustable spacer 122 in that it can include a transverse or lateral carriage recess, slot or pocket 146 positioned in the top portion 20a of carriage 20 between the first 100a and second 110a follower nut assemblies. Carriage pocket 146 can intersect with slot 18a. An angled transverse biasing or preload wedge 144 can be transversely or laterally slidably positioned within carriage pocket 146 along axis 141. The angled surface 144a of the wedge 144 can laterally face and slidably engage an angled axial end or surface 121 of the slide block 120. The angled surfaces 144a and 121 can be angled from about 5° to 10° relative to axis 141, and can be about 7°, to provide a mechanical advantage ratio of transverse or lateral wedge movement to axial slide block movement of about 6:1 to 11.4:1, and in some embodiments can be about 8:1. The wedge 144 can be laterally biased or preloaded by a biasing member such as a coil compression spring 142. The spring 142 can be properly preloaded and positioned by a spring locator member 140 inserted against one end of the pocket 146, which has a protrusion 140a for insertion into one axial end of the spring 142. The opposite end of the spring 142 can engage the end of the wedge 144, for example within a locating hole 144b, or alternatively around a protrusion. Referring to FIG. 11, the angled surface 121 of the slide block 120 can extend axially into pocket 146 for slidable engagement with the angled surface 144a of the wedge 144. The spring 142 biases or preloads the wedge 144 in the direction of arrow 143 along axis 141, thereby biasing angled surface 144a of the wedge 144 against the angled surface 121 of the slide block 120. This provides incremental self adjustment or movement of the slide block 120 and the second partial follower nut 110 axially along axis 123 in the direction of arrow $A_2$, away from the first follower nut assembly 100a and first partial follower nut 100. Also seen in FIG. 11 is that nuts 100 and 110 and associated wedges can be configured or arranged for biasing and lateral directions $T_2$. Alternatively, nuts 100 and/or 110 can be configured or arrange for biasing in the lateral direction $T_1$. Additionally, adjustable spacer 145 can be positioned on the opposite axial end of slide block 120 having an appropriately angled surface to bias and move slide block 120 axially in the opposite direction $A_1$. Bias in directions $T_1$, $T_2$, $A_1$ and $A_2$ can be selected to suit the situation at hand, which can include for example whether lead screw 19 has right-hand or left-hand threads.

Figure 12:
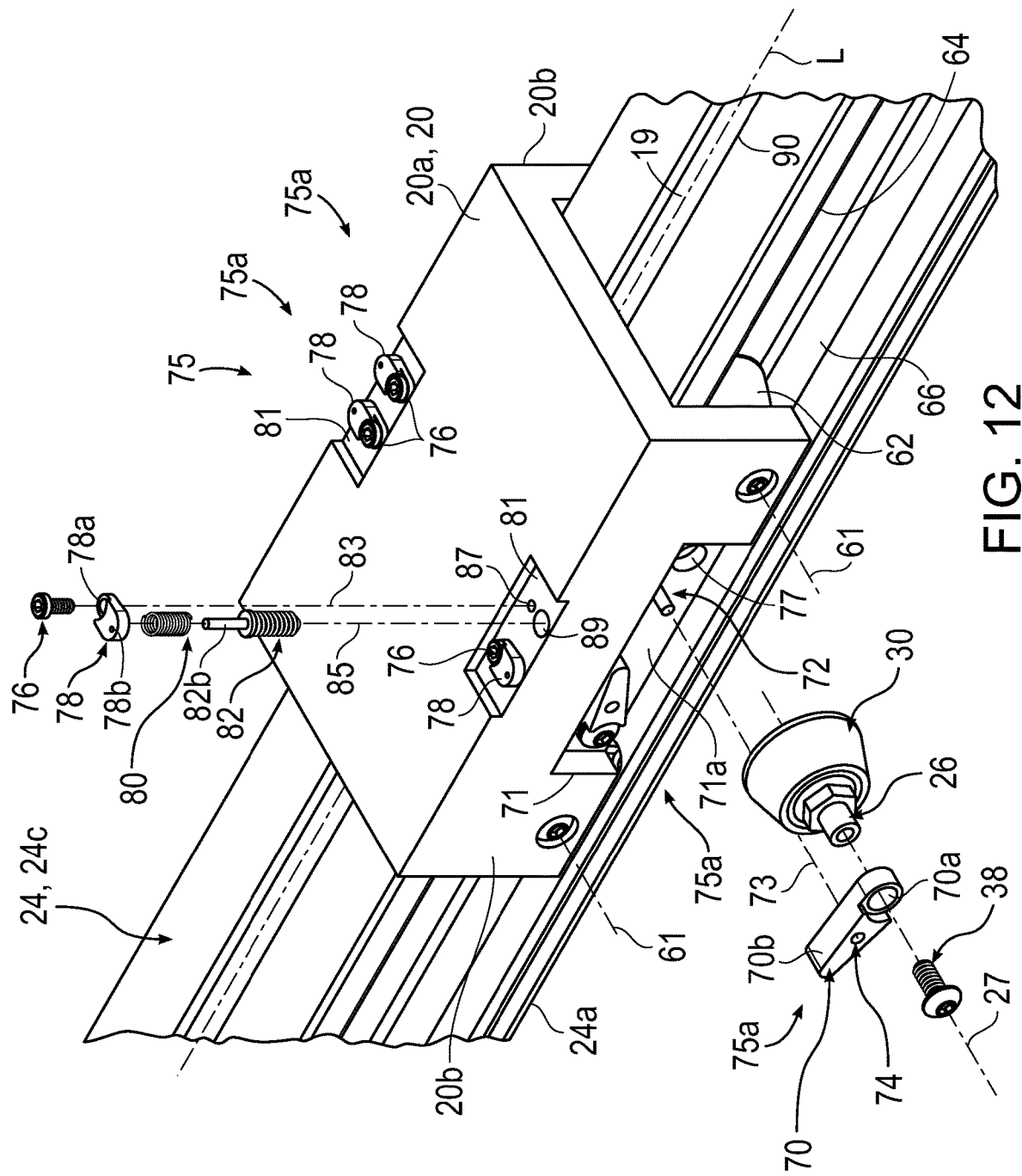
FIG. 12 is a perspective view of another embodiment of a carriage on a rail in the present invention having another adjustable roller arrangement.
Figure 13:
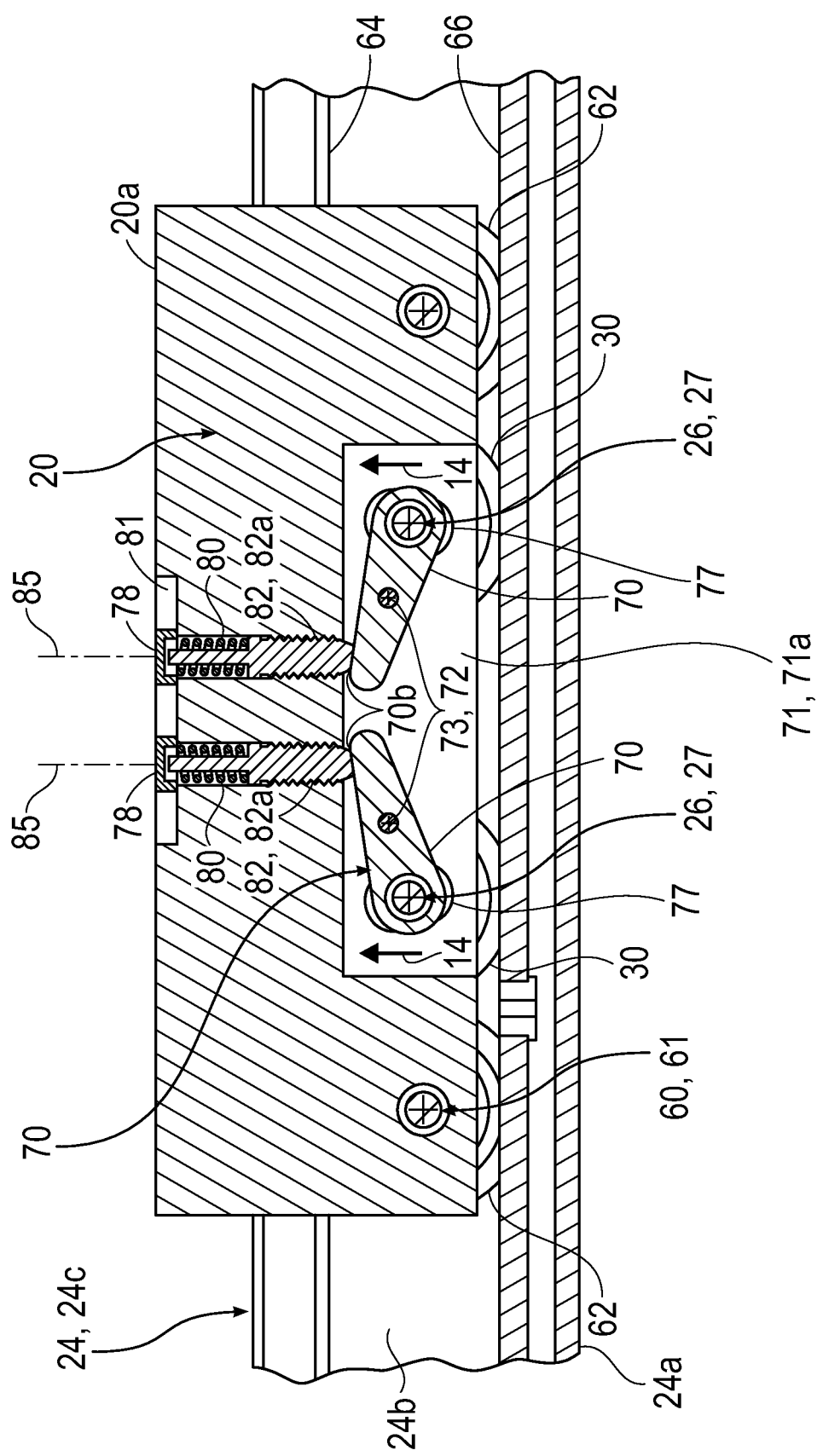
FIG. 13 is a section view of the carriage of FIG. 12.

Referring to FIGS. 12 and 13, in another embodiment, a roller adjustment system 75 having four roller adjustment assemblies 75a can be employed instead of roller adjustment system 12, for adjusting the position of adjustable rollers 30 relative to the fixed position rollers 62, sides 20b of carriage 20, and the rail 24. Two roller adjustment assemblies 75a can be positioned on each side 20b carriage 20 within a side indentation, recess or cavity 71, that has a rear, back or inset wall 71a, located between the fixed position rollers 62. Each roller adjustment assembly 75a can include a movable pivot or swing arm or member 70 to which an adjustable position roller 30 is rotatably mounted. The swing arm 70 can be rotatably or pivotably mounted to a pivot or swing arm pin shaft or axle 72, extending laterally from wall 71a at a pivot or swing arm pivot 74 centrally located or at the midportion of swing arm 70, along axis 73. The adjustable position roller 30 can be rotatably mounted to one end of the swing arm 70, at the outer end towards fixed position roller 62 by securing axle 26 through holes 70a with screw 38 along axis 27. The adjustable position roller 30 can pivot, swing or rotate to change position when swing arm 70 is pivoted. The axle 26 can extend through a hole or slot 77 in the wall 71a so that the adjustable position roller 30 is located on the other side of the wall 71a for engaging race 64 of rail 24. The slot 77 can be shaped or sized to allow up/down pivoting movement of the axle 26 therein, allowing up/down movement of the adjustable position roller 30. Each lateral side of the top portion 20a of the carriage 20 can have a top indentation, recess or cavity 81, in which two holes 82a extend downwardly along upright or vertical axes 85 into recess 71. Each hole 82a can include a threaded portion for engaging the threads of an adjustable plunge screw 82, which can act as a mechanical advantage pushing, urging, advancing or moving member. The plunge screw 82 extends into recess 71 for engaging the top surface 70b of swing arm 70, on the opposite side of pivot 74 from adjustable position roller 30. A torsion or torsional preload biasing member or spring 80 can be positioned within hole 82a over or around shaft or rod portion 82b of plunge screw 82, with a tab or protrusion at the bottom end of the spring 80 being secured to screw 82, such as a hole. A tab or protrusion at the top end of the spring 80 can be secured to a preload set member or plate 78 in a hole 78b. The preload set plate 78 can be rotated to preset the torsional bias spring 80 within hole 82a and then locked in place over hole 82a with a preload lock screw 76 through holes 78a in plate 78, and engaging threaded hole 87 in recess 81 along upright or vertical axis 83, which is parallel to axis 85.

In use, as wear of rollers 30, 62 and the rail 24 occurs over time, play between the carriage 20 and the rail 24 can be compensated by the torsional bias of the spring 80 of each roller adjustment assembly 75a incrementally rotating a plunge screw 82, which incrementally extends the plunge screw 82 vertically downwardly with mechanical advantage from hole 82a into recess 71 against the top surface 70b of swing arm 70. This incrementally rotationally swings or pivots the swing arm 70 about axis 73 to move the adjustable position roller 30 upwardly in the direction of arrow 14 against the upper race 64 of rail 24 for self compensating for play between the rollers 62/30 and the races 66/64 of rail 24. Although the swing arm 70 shown is configured such that the plunge screw 82 engages the top surface 70b of the swing arm 70 at about the same distance away from the pivot 74 as the location of axis 27 of adjustable position roller 30, in other embodiments these distances can be changed to provide mechanical ratios of swing arm 70 that are not a 1:1 swing ratio.

Figure 14:
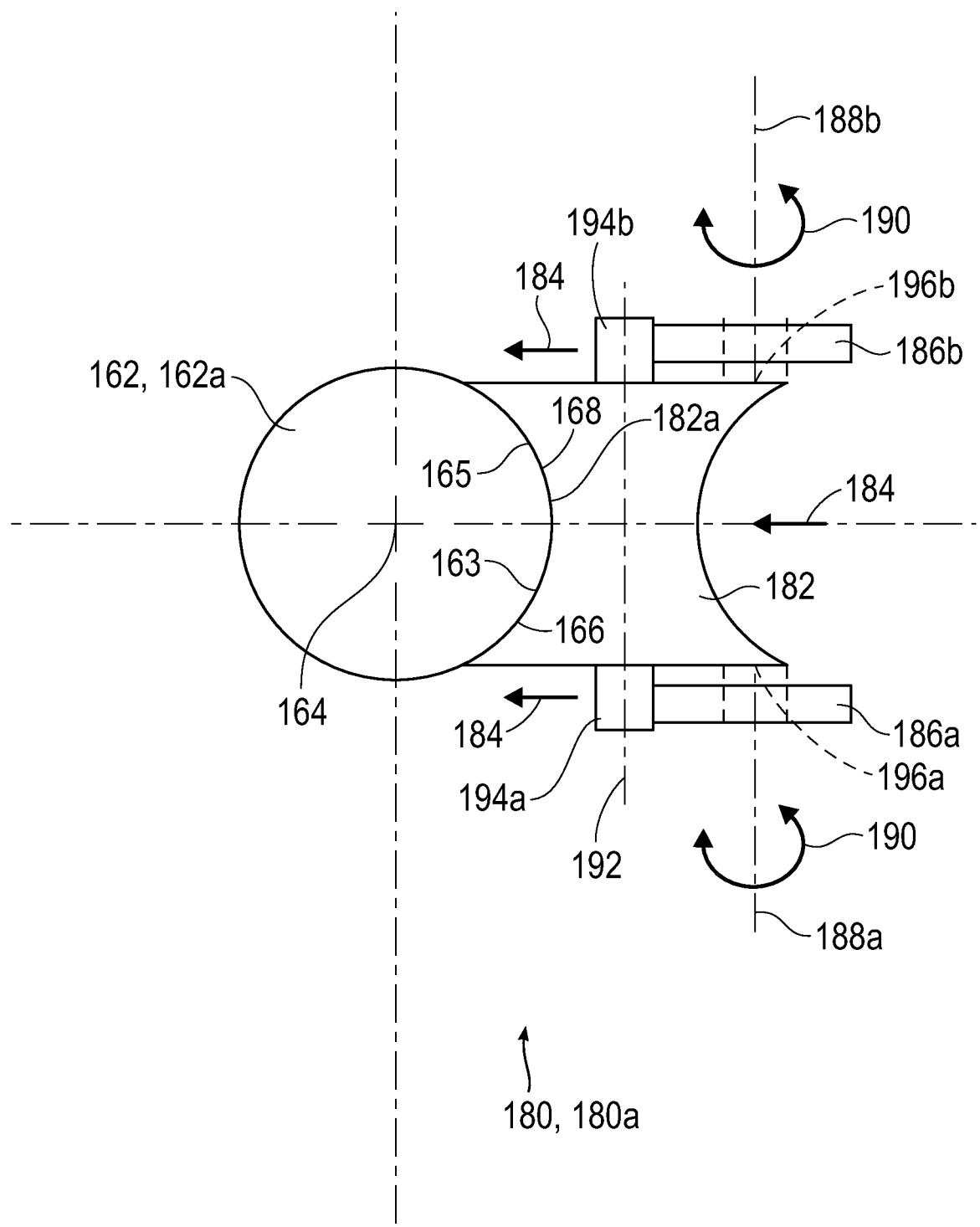
FIG. 14 schematic drawing of another embodiment of a roller adjustment assembly or system.
Figure 15:
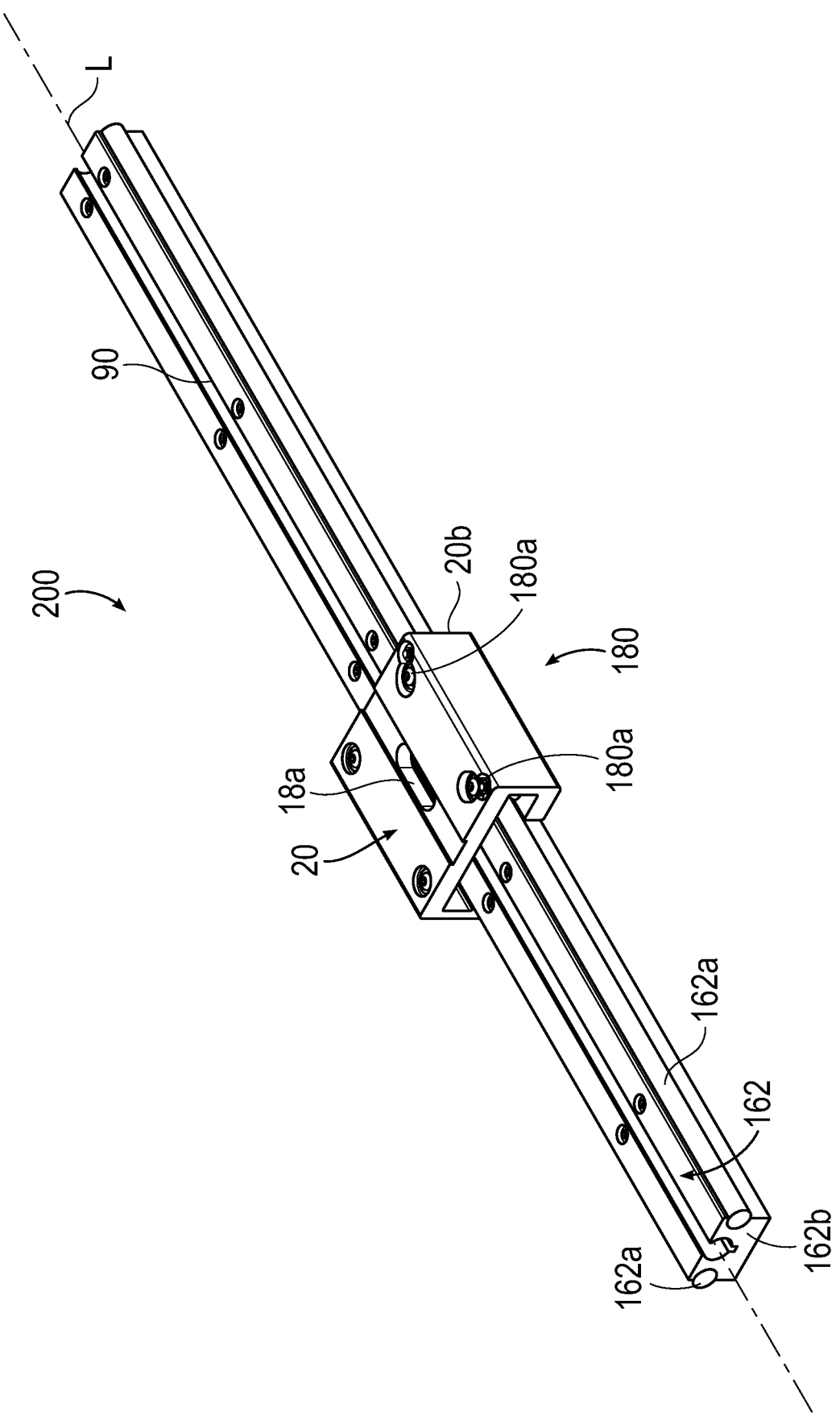
FIG. 15 is a perspective view of another embodiment of a motion device in the present invention having an embodiment of the roller adjustment assembly of FIG. 14.
Figure 16:
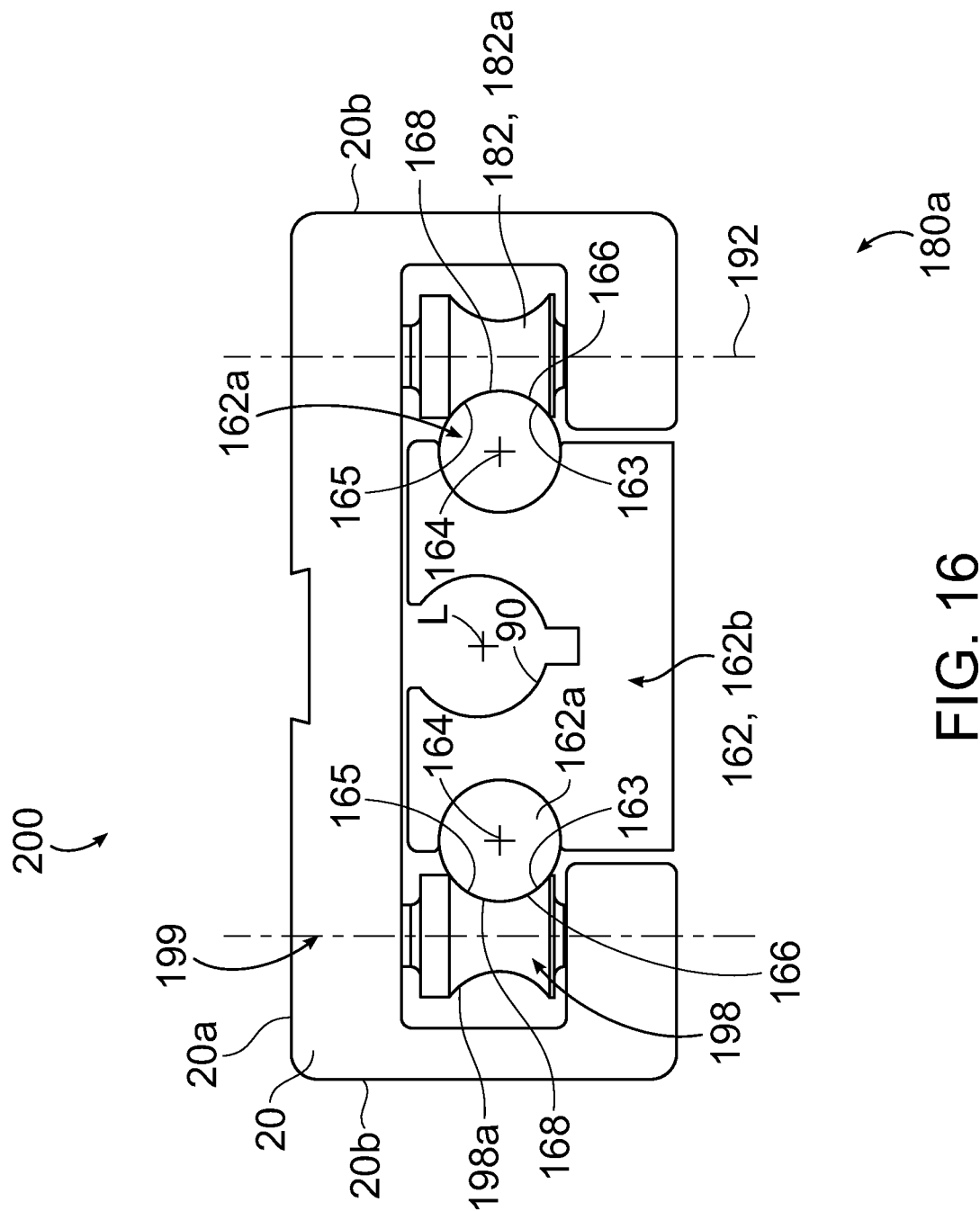
FIG. 16 is an end view of the motion device of FIG. 15.
Figure 17:
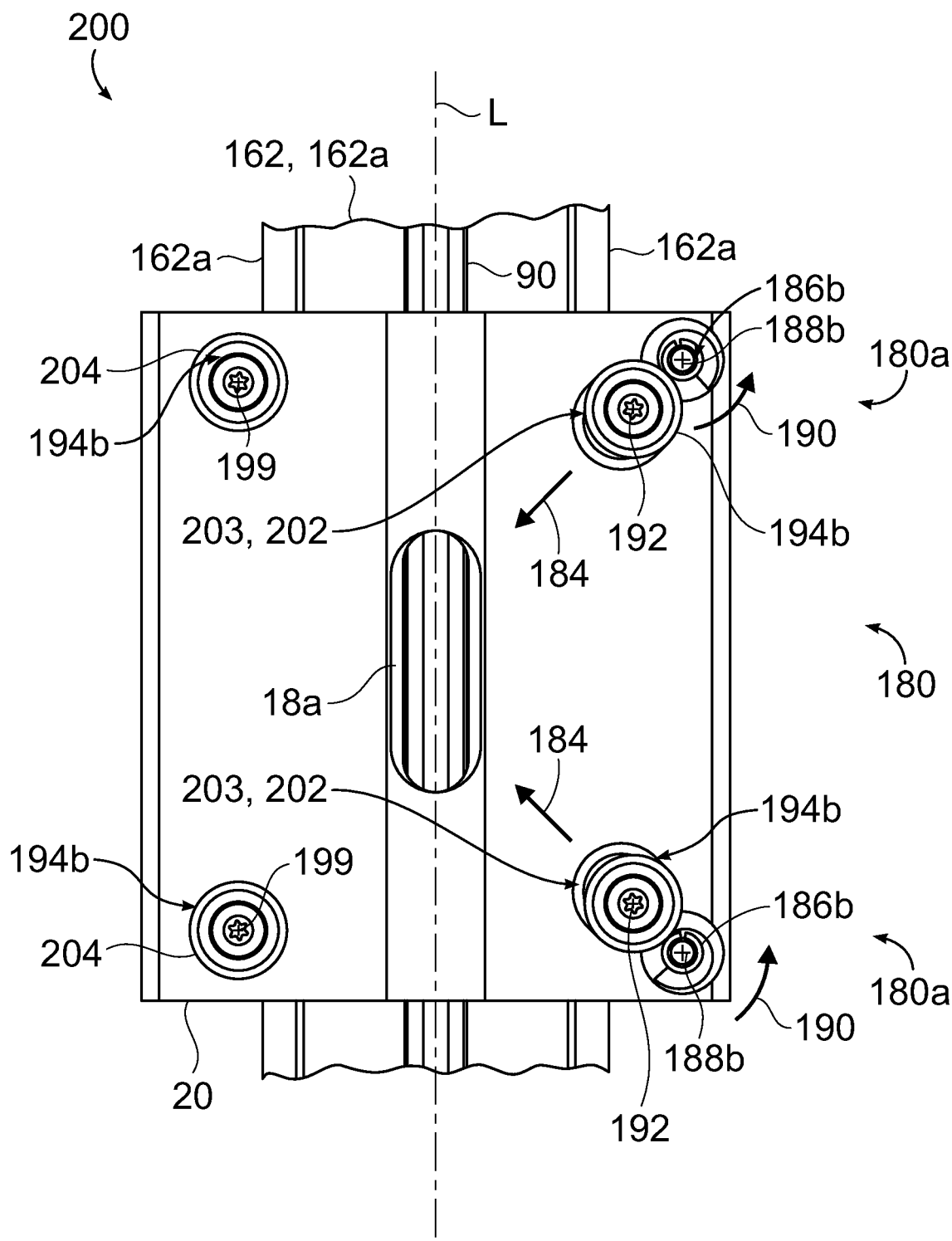
FIG. 17 is a top view of a portion thereof.

Referring to FIG. 14, low friction element or roller adjustment system 180 is another embodiment in the present invention that can be employed in place of roller adjustment system 12. Rail 162 can have at least two laterally spaced apart rail portions 162a (FIGS. 15 and 16) mounted on a rail bed or base 162b, and carriage 20 can have two low friction or roller adjustment assemblies 180a on one side 20b opposite to two fixed position low friction bearing or sliding elements, such as rotatable elements, bearings, wheel or rollers 198. Each roller adjustment assembly 180a can have a generally hourglass shaped adjustable position low friction bearing or slide element, such as a rotatable element, bearing, wheel or roller 182 with an inwardly angled, curved or concave rolling engagement surface 182a, that is movably rotatably mounted to carriage 20 about an upright or vertical axis 192 with lower 194a an upper 194b bearings or bearing assemblies. A lower rotatable cam 186a is rotatably mounted about a vertical axis 188a, and is rotationally biased against the surface of lower bearing 194a with a torsion or torsional spring 196a. An upper rotatable cam 186b is rotatable about a vertical axis 188b, and is rotationally biased against the surface of upper bearing 194b with a torsion or torsional spring 196b. Rotational bias of torsion springs 196a and 196b can rotate cams 186a and 186b about axes 188a and 188b in the direction of arrows 190 against respective bearings 194a and 194b with mechanical advantage, thereby laterally moving bearing assemblies 194a and 194b in the direction of arrows 184, resulting in adjustable position roller 182 being laterally moved against rod 162a in the direction of arrow 184. The cams 186a and 186b can act as mechanical advantage pushing, urging, advancing or moving members. With a fixed position roller 198 being positioned against the side of the second rod 162a, play between the rollers 182 and 198 and the rail 162 can be removed incrementally with self adjustment. The downwardly laterally and upwardly laterally facing surfaces 163 and 165 of rod 162a can be gripped or engaged by the upwardly laterally and downwardly laterally facing surfaces 166 and 168 of the adjustable position rollers 182 and fixed position rollers 198. As seen in FIG. 17, the direction of self adjustment of the adjustable position rollers 182 can be at an angle relative to the longitudinal axis L, for example 45°, which can provide additional mechanical advantage to the roller adjustment assembly 180a. Although rollers 182 and 198 have been shown to be hourglass shaped with curved concave rolling engagement surfaces 182a and 198a, in other embodiments, other shapes can be employed such as angled surfaces.

Referring to FIGS. 15-23, roller adjustment system 180 can be on carriage 20 in a motion device 200. Rail 162 can have two stainless steel rods 162a mounted to rail base 162b, or can be extruded together as an unitary aluminum extrusion rail. The rollers 182 and 198 can be metal or can be an overmolded polymer roller wheel on a metal shaft, such as steel or stainless steel. A motor driven lead screw 19 and follower nut assembly as previously described can be included in motion device 200.

Figure 18:
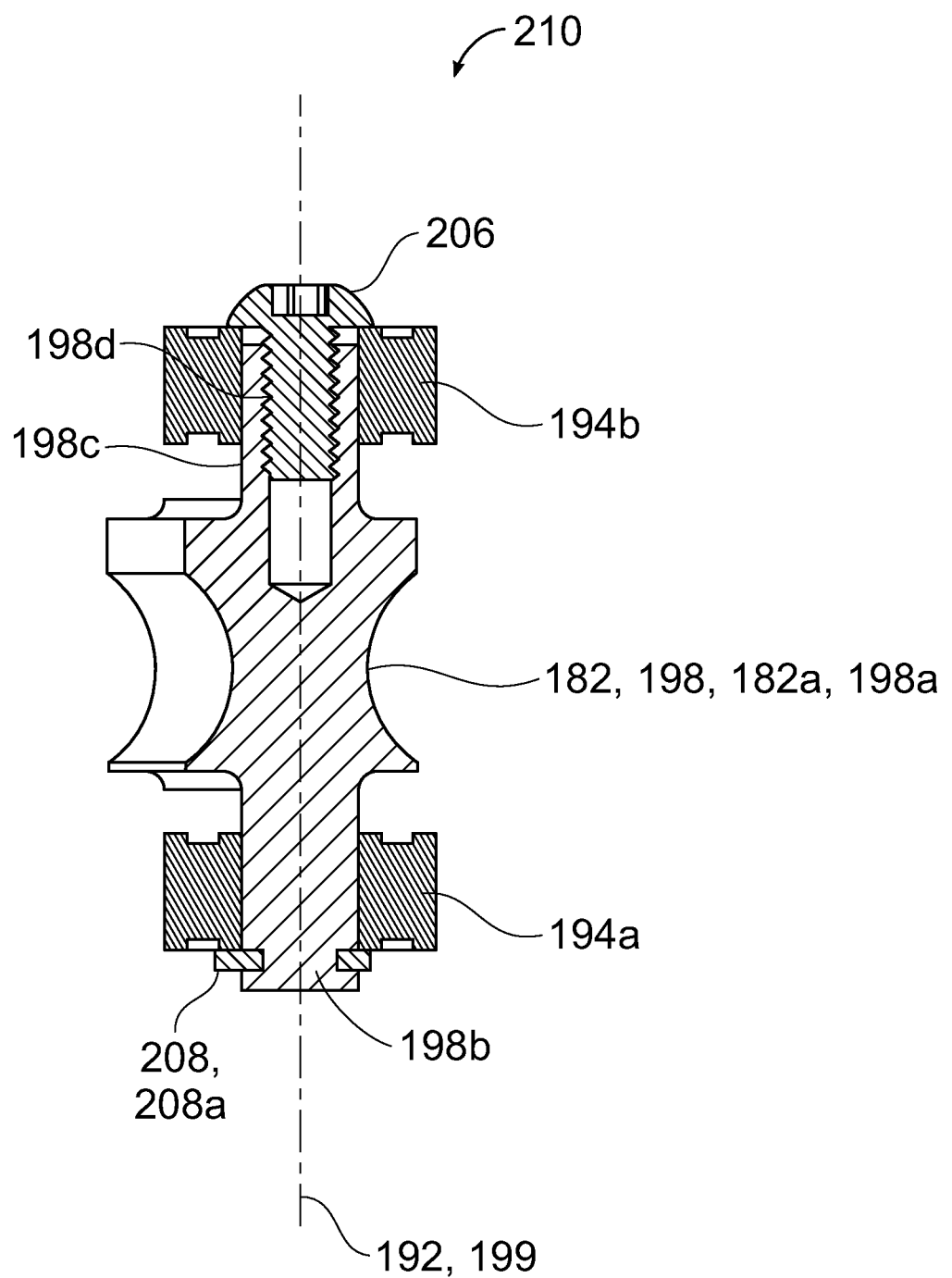
FIG. 18 is a sectional view of an embodiment of a roller assembly in the motion device of FIG. 15.
Figure 19:
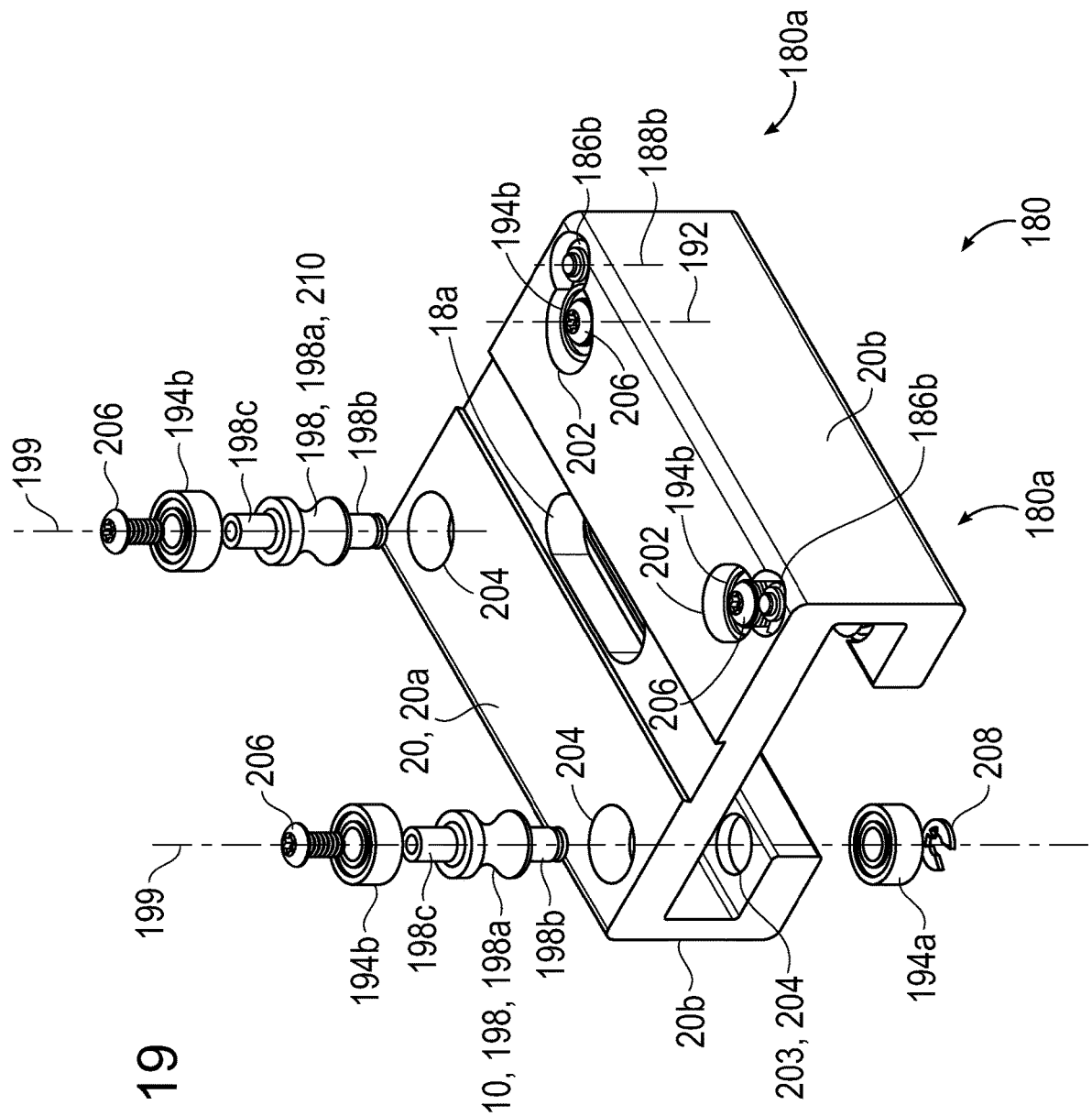
FIG. 19 is a partial exploded perspective view of an embodiment of a carriage with roller assemblies of FIG. 18.
Figure 20:
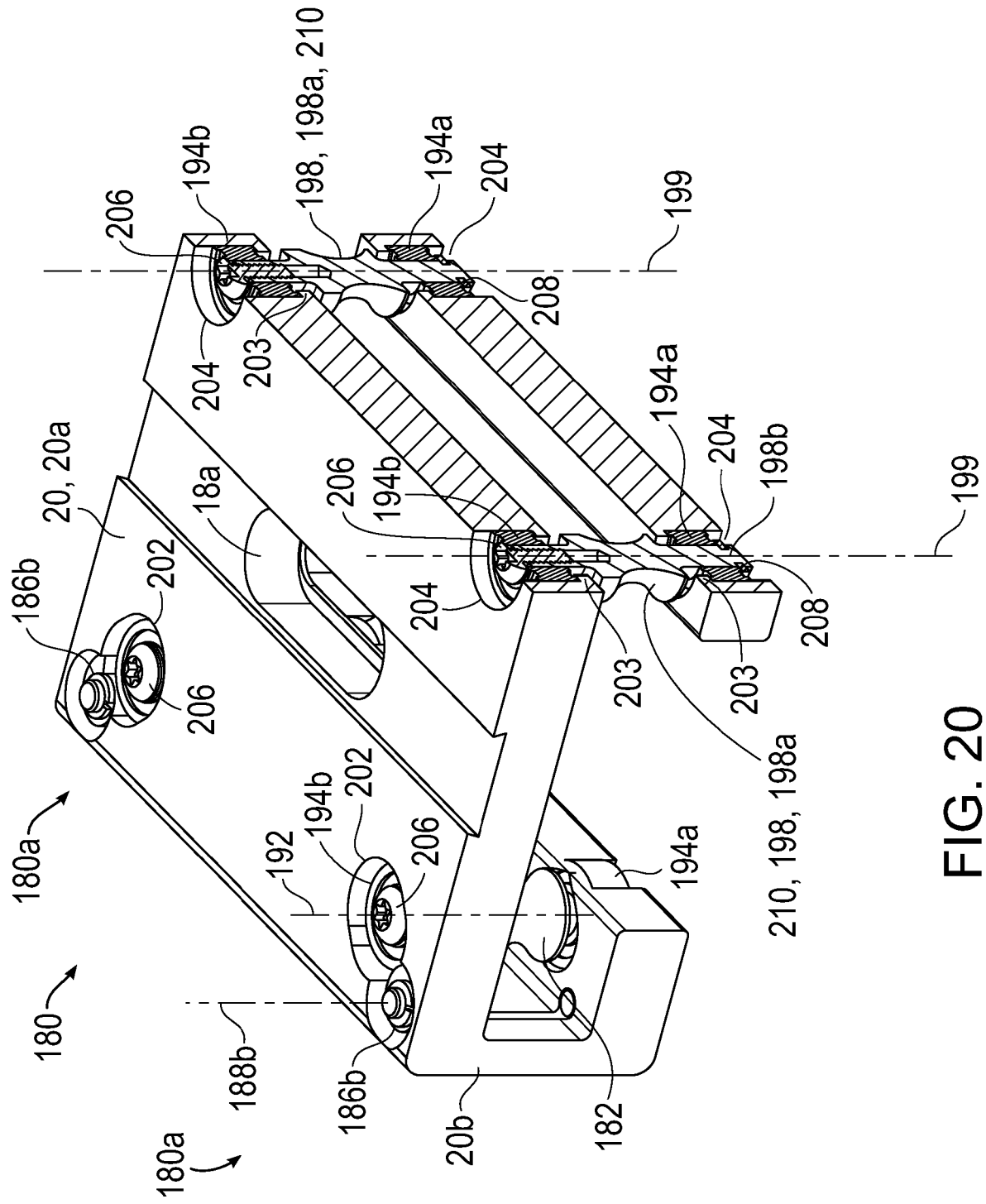
FIG. 20 is a sectional perspective view of the carriage of FIG. 19.
Figure 23:
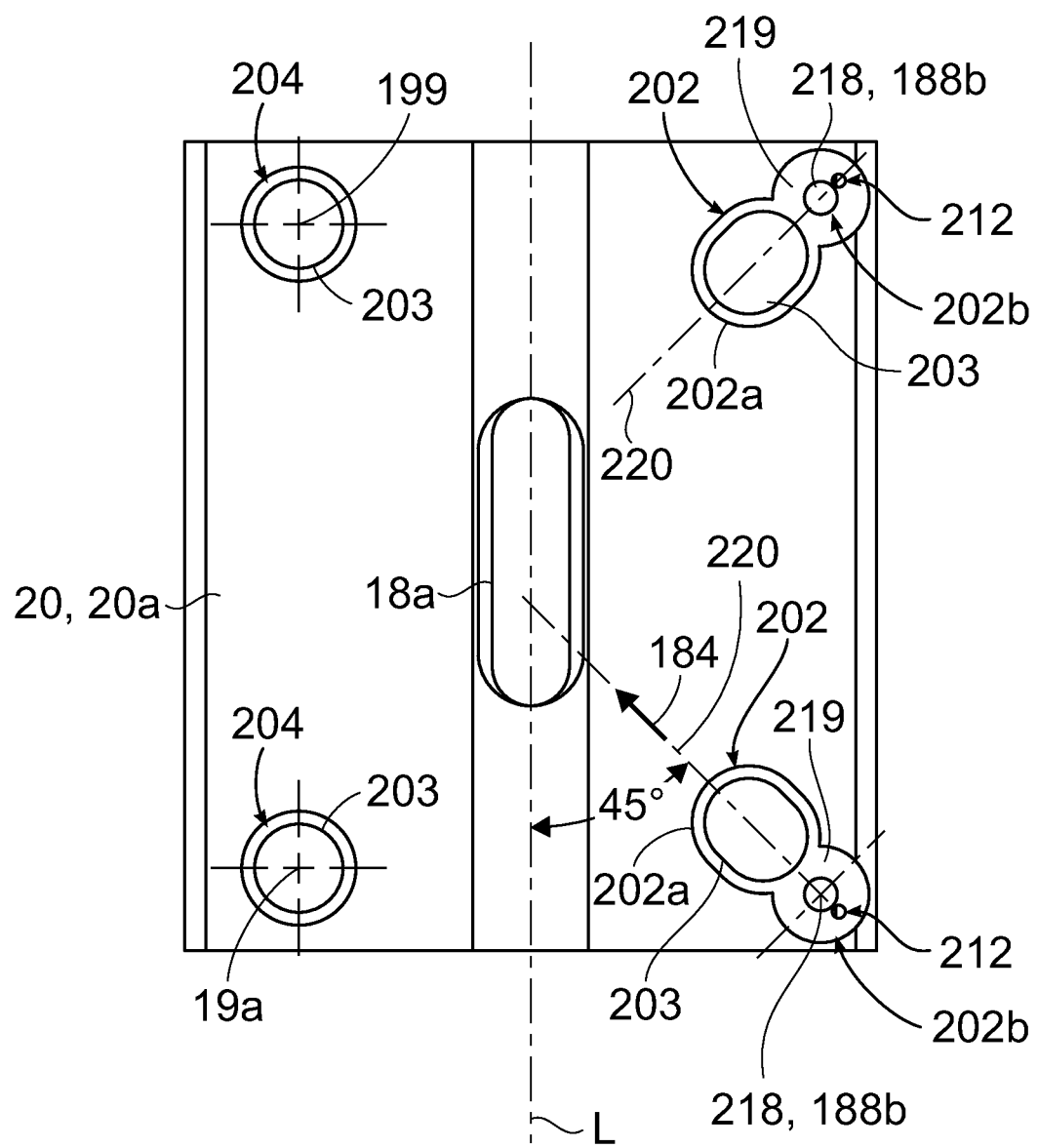
FIG. 23 is a top view of an embodiment of a carriage chassis.

Referring to FIG. 18, fixed position rollers 198 and adjustable position rollers 182 can each be formed from a roller assembly 210. The roller assembly 210 can include a roller 182 or 198 which are of similar construction, with a rolling engagement surface 182a or 198a rotating about a vertical axis 192 or 199, a lower shaft portion 198b with an annular groove 208a, an upper shaft portion 198c, and a threaded hole 198d in the upper shaft portion 198c. A lower bearing 194a can be positioned on lower shaft portion 198b and retained with a retaining or snap ring 208 in groove 208a. An upper bearing 194b can be positioned on upper shaft portion 198c and secured in place with a preload screw 206. The fixed position rollers 198 can be positioned within counterbored holes 204 in carriage 20 with the bearings 194a and 194b engaging or tightened against shoulders 203 (FIGS. 19, 20 and 23). The adjustable position rollers 182 can be movably positioned within the counterbored elongated slot portion 202a of recesses 202, with the bearings 194a and 194b slidably engaging or tightened against or over shoulders 203 (FIGS. 17 and 23). This can position the fixed position rollers 198 at two corners of carriage 20 on one side 20b, and two movable adjustable position rollers 182 at the other two corners on the opposite side 20b.

Figure 21:
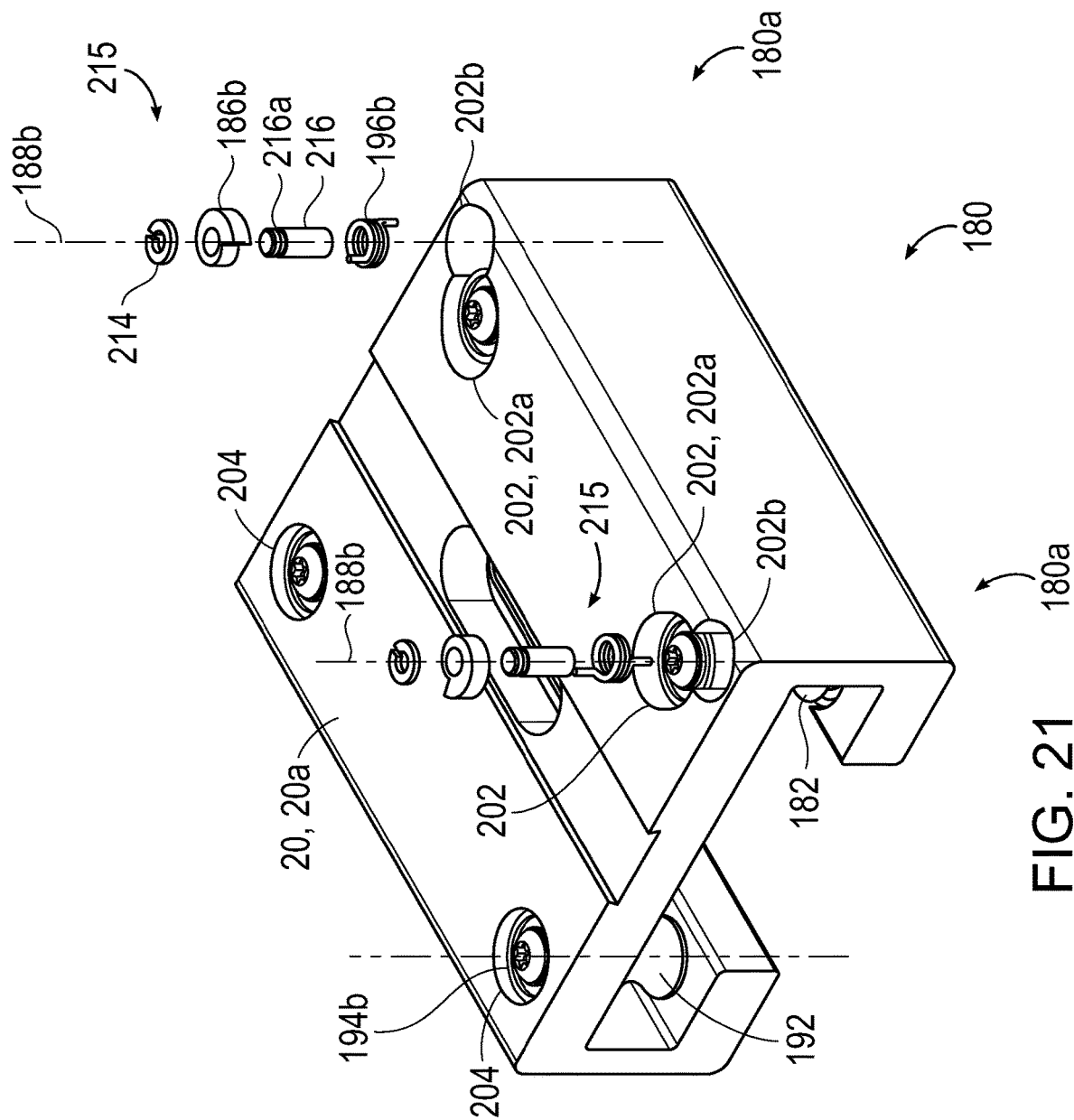
FIG. 21 is a partial exploded view of an embodiment of the carriage showing an embodiment of the cam assemblies.
Figure 22:
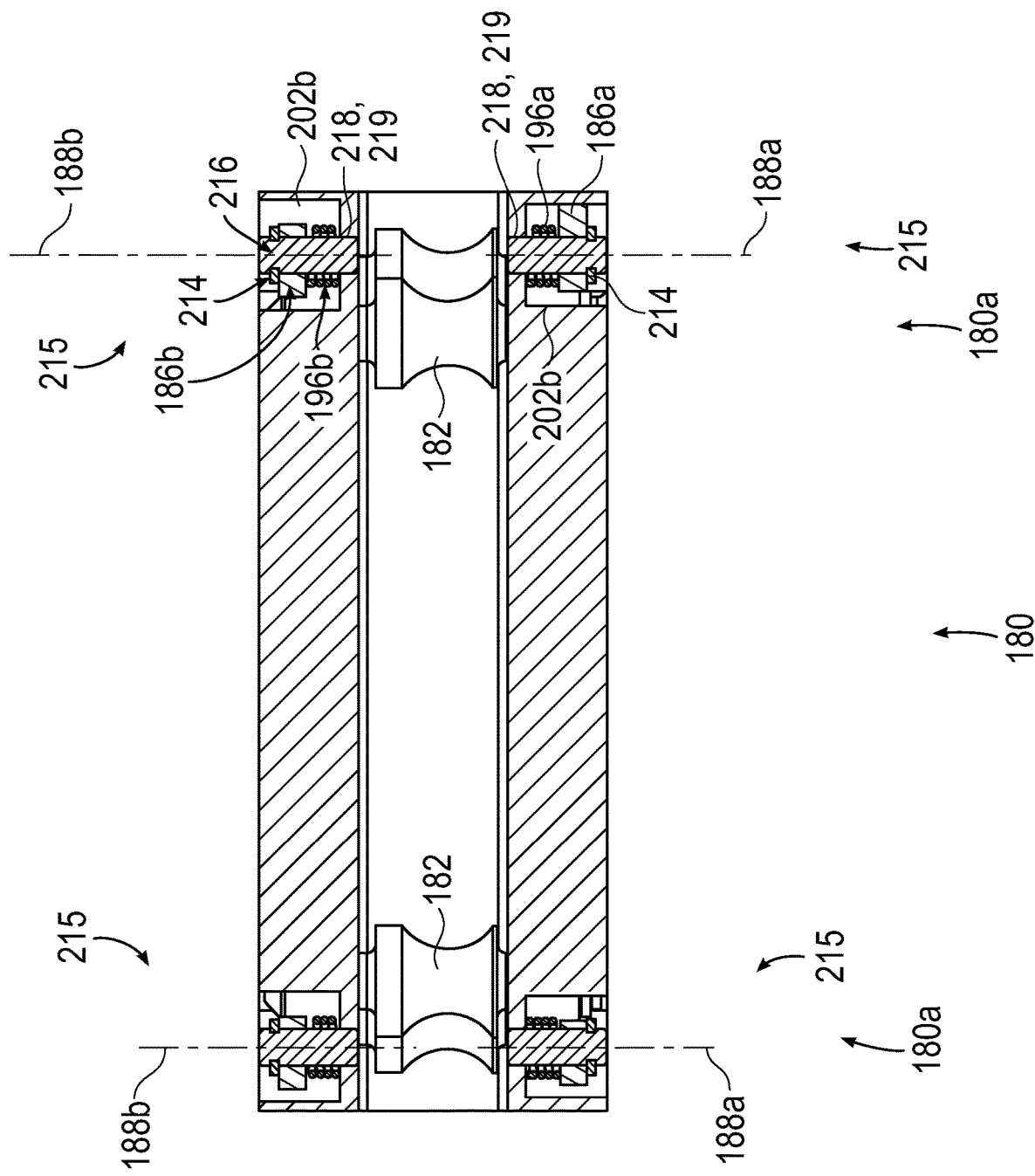
FIG. 22 is a sectional view of the carriage showing the cam assemblies.

Referring to FIGS. 21-23, the recess 202 can have a cam recess 202b extending from the slot portion 202a along axis 220 at angle, such as a 45° angle to the longitudinal axis L. The cam recess 202b can have a shoulder 219 with a hole 218 extending therethrough along an axis 188b or 188a. The cam assembly 215 can include a rotatable cam 186a or 186b mounted over a shaft 216, and retained thereon with a retaining ring 214. A torsion or torsional spring 196a or 196b can be positioned around the shaft 216 inwardly from the cam 186a or 186b. The end of the shaft 216 is positioned within hole 218 and the tab ends of the torsion spring 196a or 196b are positioned into retention holes in the cam 186a or 186b, and retention holes in the shoulder 219 of cam recess 202b. The cam 186a or 186b can be biased or rotated with torsion spring 196a or 196b for preloading the cams 186a and 186b against bearings 194a and 194b, thereby biasing the rollers 182 against rod 162a. This in combination with the elongated slot portion 202a provides the adjustable position rollers 182 with a movable, live or dynamic axle that can be incrementally self adjusted with mechanical advantage at both the upper and lower portions of the carriage 20 to better compensate for play in the system, for example compensating for wear of a polymer wheel, and can provide the proper preload for metal wheels. Wear in the system can cause torsion springs 196a and 196b to unwind, causing rotation of the cams 186a and 186b against bearings 194a and 194b with mechanical advantage. The rise of the cams can be low or gradual to prevent back driving. In addition, moving the rollers 182 along axis 220 at an angle such as 45° relative to the longitudinal axis L can further prevent back driving. The bearings 194a and 194b are preferably ball bearings but other suitable bearings can be used.

Figure 24:
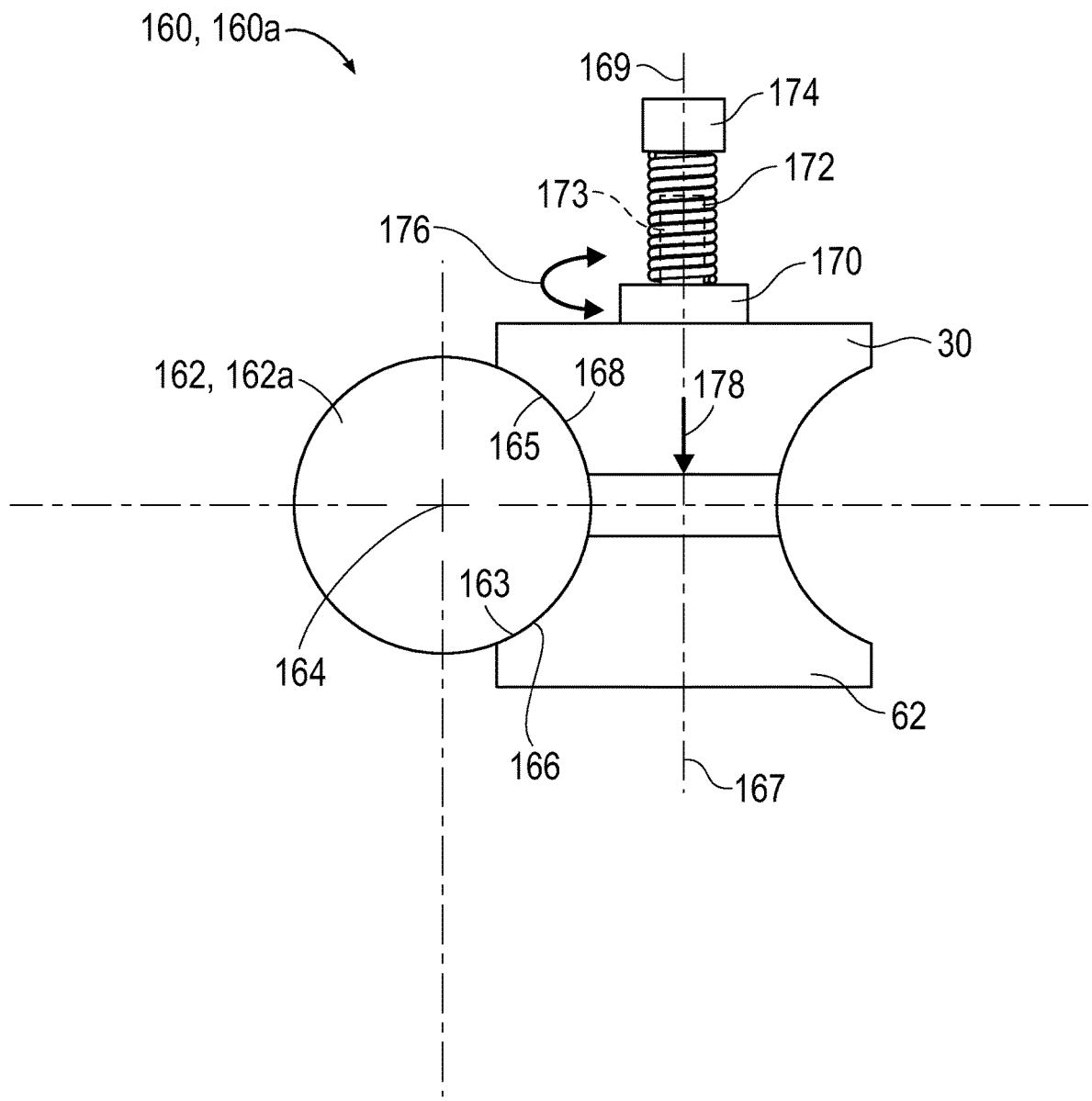
FIG. 24 is a schematic drawing of another embodiment of a roller adjustment assembly or system.

Referring to FIG. 24, roller adjustment system 160 is another embodiment in the present invention that can be employed instead of roller adjustment systems 12 or 180, and can have a selected number of roller adjustment assemblies 168 positioned for self adjustment. Rail 162 can have at least two laterally spaced apart linear rail portions 162a which can be linear rods extending along a longitudinal axis 164. The carriage 20 can have four lower fixed position rollers 62 rotatably mounted to carriage 20 at four corners about respective vertical axes 167. The fixed position rollers 62 can have curved or angled rolling engagement surfaces 166 generally facing upwardly laterally for engaging mating rail race surfaces 163 of rod 162a that generally face downwardly laterally. Each roller adjustement assembly 160a can include an upper adjustable position roller 30 that is movably and rotatably mounted to the carriage 20 about a vertical axis 169. The adjustable position roller 30 can have a curved or angled rolling engagement surface 168 generally facing downwardly laterally for engaging mating rail race surfaces 165 of rod 162a that generally face upwardly laterally. Threaded nut 170 acting as a mechanical advantage pushing, urging, advancing or moving member, can be threadably engaged with a threaded screw 173 about axis 169 and can be torsionally biased on the screw 173 by a torsion or torsional spring 172 having a preload that is set by a preload member, plate or adjustment screw 174. In use, torsional bias of nut 170 by spring 172 moves the nut 170 rotationally in the direction of arrows 176, and axially downwardly on screw 173 with mechanical advantage thereby pushing surfaces 168 of adjustable position roller 30 against the surfaces 165 of rod 162a therebetween and removing play. Although only one rod 162a and roller adjustment assembly 160a is shown in FIG. 24, it is understood that at least another rod 162a is positioned laterally apart, with fixed position rollers 62 and/or a roller adjustment assembly 160a positioned thereon, so that play can be removed with self adjustment. In the embodiment of FIG. 24, the nut 170 can be the mechanical advantage pushing member moving the movable roller portion, which can be the roller 30. The roller 30 can be made of a polymer such as Delrin and rotatably mounted to a shaft with the hole therethrough acting as the bearing. In other embodiments, bushings and bearings can be employed, and other materials used for the rollers 30. In other embodiments, the roller can be moved downwardly by driving and extending a threaded shaft. In some embodiments, rail 162 can be an extruded rail, having surfaces that approximate the rods 162a.

While example embodiments have been particularly shown and described, it will be understood by those skilled in the art that various changes in form and details may be made therein without departing from the scope of the embodiments encompassed by the appended claims.

For example, features in the various embodiments can be combined together or omitted. Although various directional designations have been used in the description for the components, it is understood that in some embodiments, components can be oriented differently. Although various materials have been described for components in some embodiments, it is understood that other embodiments can have the same or different materials. Also in some embodiments, wedges can be considered cams.

What is claimed is:
1. A motion device comprising:
a carriage for traveling along a rail, the carriage having at least one rotatable fixed position roller, and at least one rotatable adjustable roller that is movable relative to the at least one fixed position roller for self compensating for play between the rollers and mating rail race surfaces of the rail, each at least one adjustable roller being part of a movable roller portion movably mounted to the carriage, the movable roller portion being adjustably movable by a self adjustment mechanism, the self adjustment mechanism including a mechanical advantage pushing member configured for mechanical advantage ratio movement in which movement of the mechanical advantage pushing member in a first direction causes smaller pushing movement by the mechanical advantage pushing member in a second direction movably engaging the movable roller portion, the mechanical advantage pushing member being resiliently biased against the movable roller portion by a biasing arrangement, the biasing arrangement capable of causing movement of the mechanical advantage pushing member with said mechanical advantage ratio movement to interact with the movable roller portion for moving the at least one adjustable roller, for self compensating for said play.

2. The motion device of claim 1 further comprising a linear rail as the rail, the rail including bottom rail race surfaces that face generally upwardly for engaging the at least one fixed position roller and top rail race surfaces that face generally downwardly for engaging the at least one adjustable roller in a generally opposed manner.

3. The motion device of claim 2 in which the bottom rail race surfaces and opposing top rail race surfaces angle towards each other.

4. The motion device of claim 3 in which the biasing arrangement is a spring and the movable roller portion includes a movable adjustment member to which the adjustable roller is rotatably mounted, the mechanical advantage pushing member is an angled wedge positioned under the movable adjustment member, the angled wedge being laterally biased by the spring, thereby capable of providing lateral movement of the angled wedge to move the movable adjustment member and the adjustable roller upwardly against the top rail race surface with mechanical advantage for self compensating for said play.

5. The motion device of claim 3 in which the biasing arrangement is a torsional spring and the mechanical advantage pushing member is a rotatable threaded self adjusting screw, the movable roller portion includes a movable adjustment member to which the adjustable roller is rotatably mounted, the movable adjustment member being a pivoting arm to which the adjustable roller is positioned at one end, and the opposite end is engaged by the self adjusting screw, the self adjusting screw being torsionally biased by the torsional spring, thereby capable of providing rotational movement of the self adjusting screw with axial advancement to move the pivoting arm and the adjustable roller upwardly against the top rail race surface with mechanical advantage for self compensating for said play.

6. The motion device of claim 1 in which the biasing arrangement is a torsional spring and the mechanical advantage pushing member is a rotatable cam that is torsionally biased with the torsional spring, the torsional spring rotatably biasing the cam against a bearing surface associated with the at least one adjustable roller, thereby capable of providing lateral movement of the at least one adjustable roller against rail race surfaces with mechanical advantage for self compensating for said play.

7. The motion device of claim 1 in which the at least one fixed position roller engages lower rail race surfaces and the at least one adjustable position rolling engages upper rail race surfaces, the biasing arrangement being a torsional spring and the mechanical advantage pushing member being a rotatable threaded self adjusting nut that is rotatably mounted to a threaded screw, the torsional spring rotatably biasing the self adjusting nut downwardly against the at least one adjustable roller, thereby capable of providing downward movement of the at least one adjustable roller against the upper rail race surfaces with mechanical advantage for self compensating for said play.

8. The motion device of claim 1 further comprising:
a linear rail as the rail and a rotatable lead screw extending along a longitudinal axis mounted to the rail for driving the carriage along the rail, the carriage including a first partial follower nut and a second partial follower nut axially spaced and having respective first and second thread forms for engaging mating threads on the lead screw, the first partial follower nut being biased against the lead screw in a direction transverse to the longitudinal axis by a first nut transverse self adjustment mechanism for removing backlash, the second partial follower nut also being biased against the lead screw in a direction transverse to the longitudinal axis by a second nut transverse self adjustment mechanism for removing said backlash, the second partial follower nut being further biased against the lead screw axially along the longitudinal axis relative to the first partial follower nut, by a second nut axial self adjustment mechanism for removing said backlash during high load or high acceleration operation.

9. The motion device of claim 8 in which the second partial follower nut and the second nut transverse self adjustment mechanism are housed within a slide block, the slide block being axially slidably mounted within an axial slot within the carriage, the second nut axial self adjustment mechanism for axially biasing the slide block and the second partial follower nut within the axial slot, and relative to the first partial follower nut.

10. The motion device of claim 1 in which the carriage includes four fixed position rollers and four adjustable rollers positioned between the fixed position rollers.

11. The motion device of claim 1 in which the biasing arrangement is a torsional spring for rotating the mechanical advantage pushing member, rotation of the mechanical advantage pushing member causing advancement of the mechanical advantage pushing member against the movable roller portion with mechanical advantage for causing movement of the movable roller portion and the adjustable roller for self compensating for said play.

12. The motion device of claim 11 in which the mechanical advantage pushing member comprises a threaded nut, the torsional spring rotates the threaded nut for advancing the threaded nut against the adjustable roller with mechanical advantage for moving the adjustable roller.

13. The motion device of claim 12 further comprising a linear rail as the rail, the rail including rail race surfaces that the fixed position and adjustable rollers engage from generally opposite sides.

14. The motion device of claim 11 which the mechanical advantage pushing member comprises a rotatable cam, the torsional spring rotates the rotatable cam for advancing surfaces of the cam against the movable roller portion with mechanical advantage for moving the movable roller portion and the adjustable roller.

15. A motion device comprising:
a linear rail;
a carriage slidably mounted to the rail for travel along the rail; and
a rotatable lead screw extending along a longitudinal axis mounted to the rail for driving the carriage along the rail, the carriage including a first partial follower nut and a second partial follower nut axially spaced and having respective first and second thread forms for engaging mating threads on the lead screw, the first partial follower nut being biased against the lead screw in a direction transverse to the longitudinal axis by a first nut transverse self adjustment mechanism for removing backlash, the second partial follower nut also being biased against the lead screw in a direction transverse to the longitudinal axis by a second nut transverse self adjustment mechanism for removing backlash, the second partial follower nut being further biased against the lead screw along the longitudinal axis relative to the first partial follower nut, by a second nut axial self adjustment mechanism for removing backlash during high load or high acceleration operation.

16. The motion device of claim 15 which the second partial follower nut and the second nut transverse self adjustment mechanism are housed within a slide block, the slide block being axially slidably mounted within an axial slot within the carriage, the second nut axial self adjustment mechanism for axially biasing the slide block and the second partial follower nut within the axial slot, and relative to the first partial follower nut.

17. The motion device of claim 16 which the second nut axial self adjustment mechanism includes a mechanical advantage threaded member that is axially connected to the slide block and rotationally biased by a torsional spring for axially biasing the slide block with mechanical advantage.

18. The motion device of claim 16 which the second nut axial self adjustment mechanism includes a mechanical advantage angled wedge that engages across an axial end of the slide block and is biased by a spring for axially biasing the slide block with mechanical advantage.

19. The motion device of claim 16 in which the slide block and second partial follower nut are biased at least one of towards and away from the first partial follower nut for removing backlash.

20. The motion device of claim 15 which the carriage has at least one rotatable fixed position roller, and at least one rotatable adjustable roller that is movable relative to the at least one fixed position roller for self compensating for play between the rollers and mating rail race surfaces of the rail, each at least one adjustable roller being part of a movable roller portion movably mounted to the carriage, the movable roller portion being adjustably movable by a self adjustment mechanism, the self adjustment mechanism including a mechanical advantage pushing member capable of movably engaging the movable roller portion, the mechanical advantage pushing member being resiliently biased against the movable roller portion by a biasing arrangement, the biasing arrangement capable of causing movement of the mechanical advantage pushing member and the movable roller portion for moving the adjustable roller, for self compensating for said play.

21. A method of rollably moving a carriage of a motion device along a rail, the carriage having at least one rotatable fixed position roller, and at least one rotatable adjustable roller, that roll on mating engagement surfaces of the rail, the method comprising:
moving the at least one adjustable roller relative to the at least one fixed position roller for self compensating for play between the rollers and the mating rail race surfaces of the rail, each at least one adjustable roller being part of a movable roller portion movably mounted to the carriage, the movable roller portion being adjustably moved by a self adjustment mechanism, the self adjustment mechanism including a mechanical advantage pushing member configured for mechanical advantage ratio movement in which movement of the mechanical advantage pushing member in a first direction causes smaller pushing movement by the mechanical advantage pushing member in a second direction movably engaging the movable roller portion, the mechanical advantage pushing member being resiliently biased against the movable roller portion by a biasing arrangement, the biasing arrangement causing movement of the mechanical advantage pushing member with said mechanical advantage ratio movement to interact with the movable roller portion for moving the adjustable roller, for self compensating for said play.

22. The method of claim 21 in which the rail comprises a linear rail including bottom rail race surfaces that face generally upwardly and top rail race surfaces that face generally downwardly, the method further comprising engaging the bottom rail race surfaces with the at least one fixed position roller and the top rail race surfaces with the at least one adjustable roller in a generally opposed manner.

23. The method of claim 22 in which the bottom rail race surfaces and opposing top rail race surfaces angle towards each other.

24. The method of claim 23 in which the biasing arrangement is a spring and the movable roller portion includes a movable adjustment member to which the adjustable roller is rotatably mounted, the mechanical advantage pushing member being an angled wedge positioned under the movable adjustment member, the method further comprising laterally biasing the angled wedge with the spring, thereby laterally moving the angled wedge to move the movable adjustment member and the adjustable roller upwardly against the top rail race surface with mechanical advantage for self compensating for said play.

25. The method of claim 23 in which the biasing arrangement is a torsional spring and the mechanical advantage pushing member is a rotatable threaded self adjusting screw, the movable roller portion including a movable adjustment member to which the adjustable roller is rotatably mounted, the movable adjustment member being a pivoting arm to which the adjustable roller is positioned at one end, and the opposite end is engaged by the self adjusting screw, the method further comprising torsionally biasing the self adjusting screw with the torsional spring, thereby rotationally moving the self adjusting screw with axial advancement to move the pivoting arm and the adjustable roller upwardly against the top rail race surface with mechanical advantage for self compensating for said play.

26. The method of claim 21 in which the biasing arrangement is a torsional spring and the mechanical advantage pushing member is a rotatable cam torsionally biased with the torsional spring, the method further comprising rotatably biasing the cam with the torsional spring against a bearing surface associated with the at least one adjustable roller, thereby providing lateral movement of the at least one adjustable roller against rail race surfaces with the mechanical advantage for self compensating for said play.

27. The method of claim 21 in which the at least one fixed position roller engages lower rail race surfaces and the at least one adjustable roller engages upper rail race surfaces, the biasing arrangement being a torsional spring and the mechanical advantage pushing member being a rotatable threaded self adjusting nut that is rotatably mounted to a threaded screw, the method further comprising rotatably biasing the self adjusting nut with the torsional spring downwardly against the at least one adjustable roller, thereby providing downward movement of the at least one adjustable roller against the upper rail race surfaces with mechanical advantage for self compensating for said play.

28. The method of claim 21 in which the motion device further comprises a linear rail as the rail and a rotatable lead screw extending along a longitudinal axis mounted to the rail for driving the carriage along the rail, the carriage including a first partial follower nut and a second partial follower nut axially spaced and having respective first and second thread forms for engaging mating threads on the lead screw, the method further comprising:
biasing the first partial follower nut against the lead screw in a direction transverse to the longitudinal axis with a first nut transverse self adjustment mechanism for removing backlash;
biasing the second partial follower nut against the lead screw in a second direction transverse to the longitudinal axis with a second nut transverse self adjustment mechanism for said backlash; and further biasing the second partial follower nut against the lead screw axially along the longitudinal axis relative to the first partial follower nut, with a second nut axial self adjustment mechanism for removing said backlash during high load or high acceleration operation.

29. The method of claim 28 in which the second partial follower nut and the second nut transverse self adjustment mechanism are housed within a slide block, the slide block being axially slidably mounted within an axial slot within the carriage, the method further comprising axially biasing the slide block and the second partial follower nut within the axial slot, and relative to the first partial follower nut, with the second nut axial self adjustment mechanism.

30. The method of claim 21 further comprising engaging the rail with four fixed position rollers and four adjustable rollers positioned between the fixed position rollers.

31. The method of claim 21 in which the biasing arrangement is a torsional spring for rotating the mechanical advantage pushing member, the method further comprising rotating the mechanical advantage pushing member thereby causing advancement of the mechanical advantage pushing member against the movable roller portion with mechanical advantage for causing movement of the movable roller portion and the adjustable roller for self compensating for said play.

32. The method of claim 31 in which mechanical advantage pushing member comprises a threaded nut, the torsional spring rotates the threaded nut for advancing the threaded nut against the adjustable roller with mechanical advantage for moving the adjustable roller.

33. The method of claim 32 in which the rail comprises a linear rail including rail race surfaces that the fixed position and adjustable rollers engage from generally opposite sides.

34. The motion device of claim 31 in which the mechanical advantage pushing member comprises a rotatable cam, the method further comprising rotating the rotatable cam with the torsional spring for advancing surfaces of the cam against the movable roller portion with mechanical advantage for moving the movable roller portion and the adjustable roller.

35. A method of removing backlash associated with a rotatable lead screw in a motion device, the motion device having a carriage slidably mounted to a linear rail for travel along the rail driven by a rotatable lead screw extending along a longitudinal axis, and mounted to the rail, the carriage including a first partial follower nut and a second partial follower nut axially spaced and having respective first and second thread forms for engaging mating threads on the lead screw, the method comprising:

biasing the first partial follower nut against the lead screw in a direction transverse to the longitudinal axis with a first nut transverse self adjustment mechanism for removing backlash;

biasing the second partial follower nut against the lead screw in a direction transverse to the longitudinal axis with a second nut transverse self adjustment mechanism for removing backlash; and biasing the second partial follower nut against the lead screw axially along the longitudinal axis relative to the first partial follower nut with a second nut axial self adjustment mechanism for removing backlash during high load or high acceleration operation.

36. The method of claim 35 in which the second partial follower nut and the second nut transverse self adjustment mechanism are housed within a slide block, the slide block axially slidably mounted within an axial slot within the carriage, the method further comprising axially biasing the slide block and second partial follower nut within the axial slot, and relative to the first partial follower nut with the second nut axial self adjustment mechanism.

37. The method of claim 36 in which the second nut axial self adjustment mechanism includes a mechanical advantage threaded member that is axially connected to the slide block, the method further comprising rotationally biasing the mechanical advantage threaded member with a torsional spring for axially biasing the slide block with mechanical advantage.

38. The method of claim 36 in which the second nut axial self adjustment mechanism includes a mechanical advantage angled wedge that engages across an axial end of the slide block, the method further comprising biasing the mechanical advantage angled wedge with the spring for axially biasing the slide block with mechanical advantage.

39. The method of claim 36 further comprising biasing the slide block and the second partial follower nut at least one of towards and away from the first partial follower nut for removing backlash.

40. The method of claim 35 in which the carriage has at least one rotatable fixed position roller and at least one rotatable adjustable roller that roll on mating rail race surfaces of the rail, the method further comprising moving the at least one adjustable roller relative to the at least one fixed position roller for self compensating for play between the rollers and the mating rail race surfaces of the rail, each at least one adjustable roller being part of a movable roller portion movably mounted to the carriage, the movable roller portion being adjustably movable by a self adjustment mechanism, the self adjustment mechanism including a mechanical advantage pushing member capable of movably engaging the movable roller portion, the mechanical advantage pushing member being resiliently biased against the movable roller portion by a biasing arrangement, the biasing arrangement capable of causing movement of the mechanical advantage pushing member and the movable roller portion for moving the adjustable roller for self compensating for said play.

41. A motion device comprising:

a carriage for traveling along a linear rail, the carriage having at least one rotatable fixed position roller, and at least one rotatable adjustable roller that is movable relative to the at least one fixed position roller for self compensating for play between the rollers and mating rail race surfaces of the rail, each at least one adjustable roller being part of a movable roller portion movably mounted to the carriage, the movable roller portion being adjustably movable by a self adjustment mechanism, the self adjustment mechanism including a mechanical advantage pushing member capable of movably engaging the movable roller portion, the mechanical advantage pushing member being resiliently biased against the movable roller portion by a biasing arrangement, the biasing arrangement capable of causing movement of the mechanical advantage pushing member and the movable roller portion for moving the at least one adjustable roller, for self compensating for said play; and the rail including bottom rail race surfaces that face generally upwardly for engaging the at least one fixed position roller and top rail race surfaces that face generally downwardly for engaging the at least one adjustable roller in a generally opposed manner.

42. A motion device comprising:
a carriage for traveling along a rail, the carriage having at least one rotatable fixed position roller, and at least one rotatable adjustable roller that is movable relative to the at least one fixed position roller for self compensating for play between the rollers and mating rail race surfaces of the rail, each at least one adjustable roller being part of a movable roller portion movably mounted to the carriage, the movable roller portion being adjustably movable by a self adjustment mechanism, the self adjustment mechanism including a mechanical advantage pushing member capable of movably engaging the movable roller portion, the mechanical advantage pushing member being resiliently biased against the movable roller portion by a biasing arrangement, the biasing arrangement capable of causing movement of the mechanical advantage pushing member and the movable roller portion for moving the at least one adjustable roller, for self compensating for said play; and wherein the biasing arrangement is a torsional spring for rotating the mechanical advantage pushing member, rotation of the mechanical advantage pushing member causing advancement of the mechanical advantage pushing member against the movable roller portion with mechanical advantage for causing movement of the movable roller portion and the adjustable roller.

43. A method of rollably moving a carriage of a motion device along a linear rail, the carriage having at least one rotatable fixed position roller, and at least one rotatable adjustable roller, that roll on mating engagement surfaces of the rail, the method comprising:
moving the at least one adjustable roller relative to the at least one fixed position roller for self compensating for play between the rollers and the mating rail race surfaces of the rail, each at least one adjustable roller being part of a movable roller portion movably mounted to the carriage, the movable roller portion being adjustably moved by a self adjustment mechanism, the self adjustment mechanism including a mechanical advantage pushing member movably engaging the movable roller portion, the mechanical advantage pushing member being resiliently biased against the movable roller portion by a biasing arrangement, the biasing arrangement causing movement of the mechanical advantage pushing member and the movable roller portion for moving the adjustable roller, for self compensating for said play; and the rail including bottom rail race surfaces that face generally upwardly and top rail race surfaces that face generally downwardly, and engaging the bottom rail race surfaces with the at least one fixed position roller and the top rail race surfaces with the at least one adjustable roller in a generally opposed manner.

44. A method of rollably moving a carriage of a motion device along a rail, the carriage having at least one rotatable fixed position roller, and at least one rotatable adjustable roller, that roll on mating engagement surfaces of the rail, the method comprising:
moving the at least one adjustable roller relative to the at least one fixed position roller for self compensating for play between the rollers and the mating rail race surfaces of the rail, each at least one adjustable roller being part of a movable roller portion movably mounted to the carriage, the movable roller portion being adjustably moved by a self adjustment mechanism, the self adjustment mechanism including a mechanical advantage pushing member movably engaging the movable roller portion, the mechanical advantage pushing member being resiliently biased against the movable roller portion by a biasing arrangement, the biasing arrangement causing movement of the mechanical advantage pushing member and the movable roller portion for moving the adjustable roller, for self compensating for said play; and wherein the biasing arrangement is a torsional spring for rotating the mechanical advantage pushing member, rotation of the mechanical advantage pushing member thereby causing advancement of the mechanical advantage pushing member against the movable roller portion with mechanical advantage for causing movement of the movable roller portion and the adjustable roller.

* * * * *

UNITED STATES PATENT AND TRADEMARK OFFICE
CERTIFICATE OF CORRECTION

| | |
|---|---|
| PATENT NO. | : 11,105,366 B2 |
| APPLICATION NO. | : 16/437293 |
| DATED | : August 31, 2021 |
| INVENTOR(S) | : Keith Hastings Knight and Brian Huntley Regan |

It is certified that error appears in the above-identified patent and that said Letters Patent is hereby corrected as shown below:

In the Claims

Claim 7, Column 19, Line 46, delete "rolling" and insert --roller--.

Signed and Sealed this
Second Day of August, 2022

Katherine Kelly Vidal
*Director of the United States Patent and Trademark Office*